(12) United States Patent
Chintakindi et al.

(10) Patent No.: US 11,449,950 B2
(45) Date of Patent: Sep. 20, 2022

(54) DATA PROCESSING SYSTEMS WITH MACHINE LEARNING ENGINES FOR DYNAMICALLY GENERATING RISK INDEX DASHBOARDS

(71) Applicant: Allstate Insurance Company, Northbrook, IL (US)

(72) Inventors: Sunil Chintakindi, Menlo Park, CA (US); Howard Hayes, Glencoe, IL (US); Matei Stroila, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/179,790

(22) Filed: Feb. 19, 2021

(65) Prior Publication Data

US 2022/0270176 A1  Aug. 25, 2022

(51) Int. Cl.
*G06Q 40/08* (2012.01)
*G06N 20/00* (2019.01)
*G06F 3/0482* (2013.01)

(52) U.S. Cl.
CPC .......... *G06Q 40/08* (2013.01); *G06F 3/0482* (2013.01); *G06N 20/00* (2019.01)

(58) Field of Classification Search
CPC ..................................................... G06Q 40/08
See application file for complete search history.

(56) References Cited

U.S. PATENT DOCUMENTS

| | | | |
|---|---|---|---|
| 8,498,792 B2 | 7/2013 | Abboud et al. | |
| 8,510,200 B2 | 8/2013 | Pearlman et al. | |
| 8,604,920 B2 | 12/2013 | Armitage et al. | |
| 8,731,977 B1 | 5/2014 | Hardin et al. | |
| 9,053,516 B2 | 6/2015 | Stempora | |
| 9,547,987 B2 | 1/2017 | Sloop et al. | |
| 9,615,213 B2 | 4/2017 | Tibbitts et al. | |
| 9,990,781 B2 | 6/2018 | Haidar et al. | |

(Continued)

OTHER PUBLICATIONS

"Could the Best Backseat Driver Be a Frontseat AI?", arm Blueprint, Future Focus, Sep. 19, 2019, downloaded from <https://www.arm.com/blogs/blueprint/future-focus).

(Continued)

*Primary Examiner* — Edward Chang
(74) *Attorney, Agent, or Firm* — Polsinelli PC

(57) ABSTRACT

Methods, computer-readable media, software, and apparatuses include receiving, from a plurality of risk information sources, risk information associated with a user account, wherein the risk information includes a plurality of risk components, determining, for each of the plurality of risk components, an impact score and a risk probability by applying a machine learning model to risk information associated with the user account, generating an interactive risk index dashboard including a plurality of interactive risk index elements, wherein each of the plurality of interactive risk index elements is associated with a risk component of the plurality of risk components, and displaying, on the display of the apparatus, the interactive risk index dashboard, wherein each of the plurality of interactive risk index elements is displayed in a portion of the interactive risk index dashboard in accordance with a respective determined impact score and risk probability.

21 Claims, 8 Drawing Sheets

(56) References Cited

U.S. PATENT DOCUMENTS

| | | |
|---|---|---|
| 10,019,009 B2 | 7/2018 | Chintakindi |
| 10,023,114 B2 | 7/2018 | Adams et al. |
| 10,049,408 B2 | 8/2018 | Carver et al. |
| 10,121,148 B1 | 11/2018 | Kozlowski et al. |
| 10,198,772 B2 | 2/2019 | Parameshwaran |
| 10,416,670 B1 | 9/2019 | Fields et al. |
| 10,467,824 B2 | 11/2019 | Rosenbaum |
| 2006/0253307 A1 | 11/2006 | Warren et al. |
| 2014/0095214 A1 | 4/2014 | Mathe et al. |
| 2015/0161913 A1 | 6/2015 | Dominguez et al. |
| 2016/0364823 A1 | 12/2016 | Cao |
| 2018/0336353 A1* | 11/2018 | Manadhata ......... G06F 16/3334 |
| 2020/0013124 A1* | 1/2020 | Obee ..................... G06Q 40/08 |
| 2020/0175786 A1 | 6/2020 | Bongers et al. |

OTHER PUBLICATIONS

Guy Hacquard, "Optimise Safety, Productivity & Profitability", EROAD, Roadmarking Industry Association of Australia.

\* cited by examiner

ND DASHBOARDS

FIELD OF ART

Aspects of the disclosure generally relate to methods and computer systems, including one or more computers particularly configured and/or executing computer software and one or more sensors or devices operably connected to the one or more computers. More specifically, aspects of this disclosure relate to systems and methods for determining one or more risk indices associated with a user account and displaying the risk indices in an interactive risk index dashboard on one or more display devices.

BACKGROUND

Insurance policies are generally purchased by customers from various insurance providers. Conventional policies generally provide coverage to the user for a term of the policy based on payment of a premium associated with the policy. Such term based policies might not account for factors such as customer behaviors, environmental conditions, biometric information, or the like. Rather, coverage may be provided for the term, regardless of such factors.

Many devices include sensors and internal computer systems designed to monitor, store and transmit various types of data, such as biometric data, health data, vehicle data, environmental conditions, digital information, property condition data, and the like. Many devices also include one or more communication systems designed to send and receive information from inside or outside the device. Such information can include various types of additional, related data.

Despite advances in various technologies, however, it may be difficult to effectively identify and evaluate various risks associated with a user and to present such risks to a user in an easy to understand and interactive format. Such effective identification and presentation may be hampered by lack of tools to cohesively collect a wide range of information from many different sources.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for determining one or more risk indices associated with a user and displaying the risk indices in an interactive dashboard on one or more display devices. In particular, based on collected information from a plurality of sources associated with a user account, one or more risk indices may be determined. Accordingly, based on the collected information, one or more risk indices may be identified, calculated, and/or determined.

Advantageous solutions to the problems presented above, and other issues which will be apparent upon the reading of the present disclosure, may be to provide an apparatus that includes one or more processors, and memory storing instructions that, when executed by the one or more processors, cause the apparatus to receive, from a plurality of risk information sources, risk information associated with a user account, wherein the risk information includes a plurality of risk components, determine, for each of the plurality of risk components, an impact score and a risk probability by applying a machine learning model to risk information associated with the user account, generate an interactive risk index dashboard including a plurality of interactive risk index elements, wherein each of the plurality of interactive risk index elements is associated with a risk component of the plurality of risk components, and display, on the display of the apparatus, the interactive risk index dashboard, wherein each of the plurality of interactive risk index elements is displayed in a portion of the interactive risk index dashboard in accordance with a respective determined impact score and risk probability.

In some aspects, the memory may store additional computer-readable instructions that, when executed by the one or more processors, further cause the apparatus to receive a user interaction with a portion of the interactive risk index dashboard, and, display additional information associated with the portion of the interactive risk index dashboard based on the user interaction.

In some aspects, the plurality of interactive risk index elements may be displayed in a grid format in the interactive risk index dashboard, wherein a first axis in the grid format displays the impact score and a second axis in the grid format displays the risk probability.

In some aspects, each of the plurality of interactive risk index elements may include one or more components of additional information, and the one or more components of additional information may be displayed with a respective interactive risk index element or may be provided in a sub-display of the interactive risk index dashboard upon a user interaction with a respective interactive risk index element. The one or more components of additional information include at least one of: a descriptor, a categorical indicator, a risk coding indicator, or a risk reduction recommendation.

In some aspects, the memory may store additional computer-readable instructions that, when executed by the one or more processors, further cause the apparatus to determine a total risk index based on the plurality of risk components, and display, in a portion of the interactive risk index dashboard, the total risk index.

In some examples, the memory may store additional computer-readable instructions that, when executed by the one or more processors, further cause the apparatus to display a user prompt requesting additional risk information associated with the user account, receive user input providing the requested additional risk information, and update at least one of the plurality of interactive risk index elements in the interactive risk index dashboard in accordance with the received user input.

In some arrangements, the memory may store additional computer-readable instructions that, when executed by the one or more processors, further cause the apparatus to determine a confidence level for each of the plurality of risk components, wherein the confidence level relates to a reliability of an associated risk information source.

In some aspects, the memory may store additional computer-readable instructions that, when executed by the one or more processors, further cause the apparatus to calculate a projected risk probability of a future risk occurrence based on at least one of the plurality of risk components.

In some example arrangements, the memory may store additional computer-readable instructions that, when executed by the one or more processors, further cause the apparatus to generate a first offer for a risk index-based insurance policy based on at least one of the plurality of risk components and current information associated with the at least one of the plurality of risk components, and generate a second offer for a risk index-based insurance policy based on the at least one of the plurality of risk components and based on the user completing a risk reduction recommendation associated with the at least one of the plurality of risk components, wherein the first offer, the second offer, and the risk reduction recommendation are displayed with a respective interactive risk index element or are provided in a sub-display of the interactive risk index dashboard upon a user interaction with a respective interactive risk index element.

In accordance with further aspects of the present disclosure, a method disclosed herein may include receiving, from a plurality of risk information sources, risk information associated with a user account, wherein the risk information includes a plurality of risk components, determining, for each of the plurality of risk components, a risk score, the risk score including an impact score and a risk probability by applying a machine learning model to risk information associated with the user account, generating an interactive risk index dashboard including a plurality of interactive risk index elements, wherein each of the plurality of interactive risk index elements is associated with a risk component of the plurality of risk components, displaying, on a display of a user device, the interactive risk index dashboard, wherein each of the plurality of interactive risk index elements is displayed in a portion of the interactive risk index dashboard in accordance with a respective determined impact score and risk probability, and responsive to receiving a user interaction at an interactive risk index element in the interactive risk index dashboard, providing an additional sub-display with information relating to the interactive risk index element.

In some aspects, the method may further include receiving a user interaction with a portion of the interactive risk index dashboard, and based on the user interaction, displaying one or more components of additional information associated with the portion of the interactive risk index dashboard.

In some aspects, displaying the interactive risk index dashboard may include displaying the plurality of interactive risk index elements in a grid format in the interactive risk index dashboard, wherein a first axis in the grid format displays the impact score and a second axis in the grid format displays the risk probability.

In some examples, each of the plurality of interactive risk index elements may include one or more components of additional information, and the method may further include displaying one or more components of additional information with a respective interactive risk index element or in a sub-display of the interactive risk index dashboard upon receiving a user interaction with a respective interactive risk index element. In some examples the one or more components of additional information may include at least one of: a descriptor, a categorical indicator, a risk coding indicator, or a risk reduction recommendation.

In accordance with further aspects of the present disclosure, a system disclosed herein may include a first computing device and a second computing device in signal communication with the first computing device. The first computing device may include a display, a processor, and memory storing instructions that, when executed by the processor, cause the first computing device to: receive, from the at least one other computing device, risk information associated with a user account, wherein the risk information includes a plurality of risk components, determine, for each of the plurality of risk components, an impact score and a risk probability by applying a machine learning model to risk information associated with the user account, generate an interactive risk index dashboard including a plurality of interactive risk index elements, wherein each of the plurality of interactive risk index elements is associated with a risk component of the plurality of risk components, and provide, on the display, the interactive risk index dashboard, wherein each of the plurality of interactive risk index elements is displayed in a portion of the interactive risk index dashboard in accordance with a respective determined impact score and risk probability.

In some arrangements, the system may further include a second computing device in signal communication with, wherein the second computing device may include a processor, at least one sensor, a wireless communication interface, and memory storing instructions that, when executed by the processor, cause the second computing device to: record sensor data using the at least one sensor, wherein the sensor data is associated with a risk component of the plurality of risk components, and transmit the sensor data to the first computing device. In some examples, the at least one sensor may include a biometric device and the sensor data may include biometric data relating to a user associated with the user account. In some examples, the at least one sensor may include a telematics device and the sensor data may include vehicle data relating to a vehicle associated with the user account.

In some examples, each of the plurality of interactive risk index elements may include one or more components of additional information, and the one or more components of additional information may be displayed with a respective interactive risk index element or may be provided in a sub-display of the interactive risk index dashboard upon a user interaction with a respective interactive risk index element.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
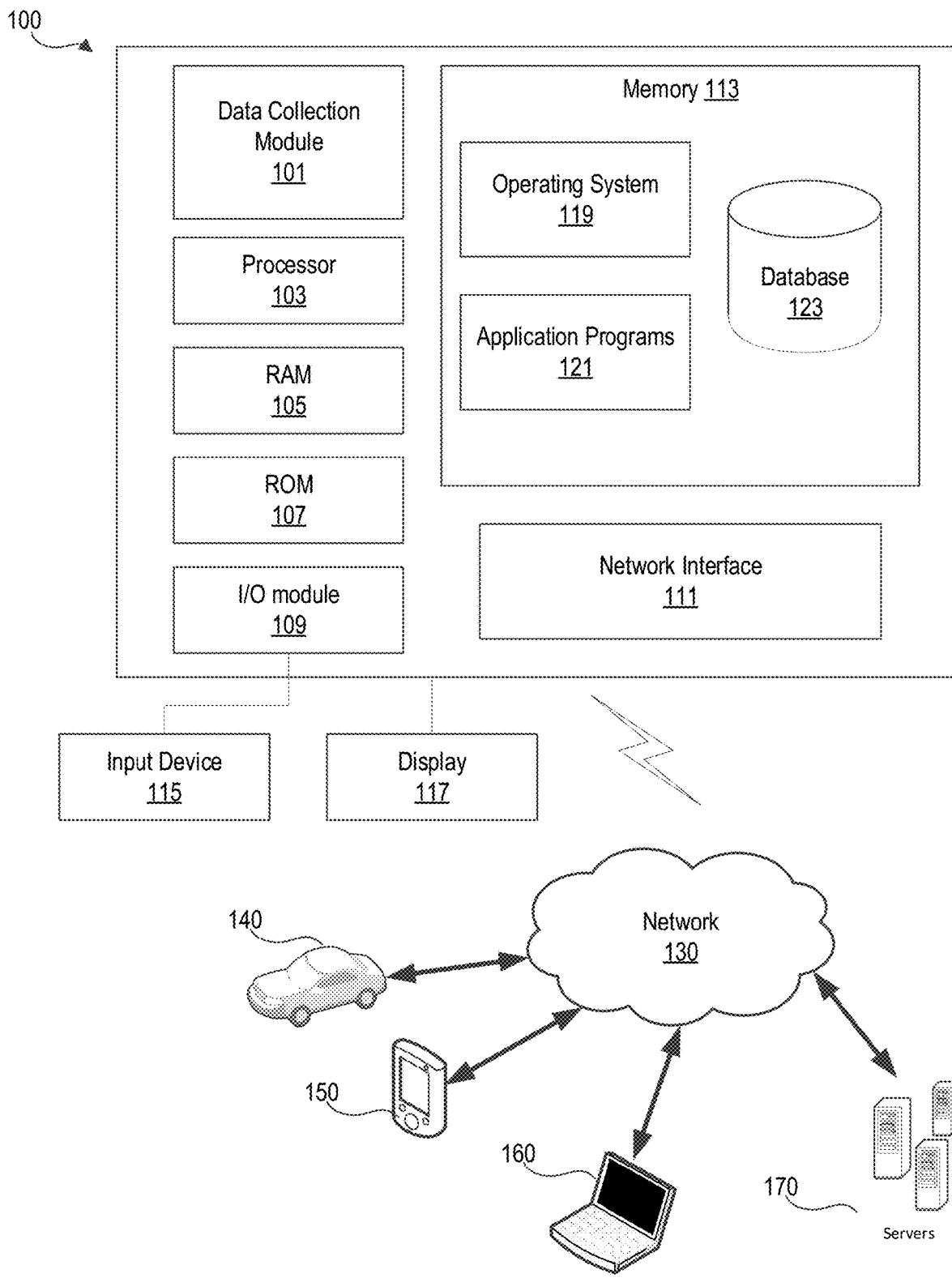
FIG. 1 illustrates an example computing environment that may be used in accordance with one or more aspects described herein.

In accordance with various aspects of the disclosure, methods, computer-readable media, software, and apparatuses are disclosed for generating and displaying an interactive risk index dashboard based on obtained information for a plurality of risk information sources associated with a user account. As described herein, interactive risk index dashboards may include a plurality of interactive risk elements, each associated with a respective different risk component.

In some instances, users may need to access a number of various different sources to understand a variety of risks that affect them. As a result, it may be difficult for users to understand a succinct summary of such risks. Also, for example, risk information, such as a probability of a risk occurring or the impact of the occurrence on the user, may be difficult to ascertain from information provided by various organizations. As another example, user may lack an ability to compare certain types of risks relative to other different types of risks. Additionally, users are often unaware of potential mitigating actions or steps that mat reduce the likelihood or negative impact associated with such risks.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

As will be appreciated by one of skill in the art upon reading the following disclosure, various aspects described herein may be embodied as a method, a specially-programmed computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

In one or more arrangements, aspects of the present disclosure may be implemented with a computing device. FIG. 1 illustrates a block diagram of an example computing environment including risk index determination device 100 (also referred to herein as a risk index analysis device or a risk index determination and analysis device) that may be used in accordance with one or more aspects described herein. The risk index determination device 100 may be a computing device, such as a personal computer (e.g., a desktop computer), server, laptop computer, notebook, tablet, smartphone, etc. The risk index determination device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), field programmable gate arrays (FPGA), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, risk index determination device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the risk index determination device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the risk index determination device 100 may provide input data. The I/O module 109 may also be configured to be connected to a display device 117, such as a monitor, television, touchscreen, etc., and may include a graphics card. For example, the I/O module 109 may be configured to receive biometric data from a user. The display device 117 and input device 115 are shown as separate elements from the risk index determination device 100; however, they may be within the same structure. On some risk index determination devices 100, the input device 115 may be operated by a user or customer to interact with the data collection module 101, including providing information about customer preferences, customer information, account information, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the risk index determination device 100 to perform various functions. For example, memory 113 may store software used by the risk index determination device 100, such as an operating system 119 and application programs 121, and may include an associated database 123.

Although not shown in FIG. 1, various elements within memory 113 or other components in the risk index determination device 100, may include one or more caches, for example, CPU caches used by the processing unit 103, page caches used by the operating system 119, disk caches of a hard drive, and/or database caches used to cache content from database 123. For embodiments including a CPU cache, the CPU cache may be used by one or more processors in the processor 103 to reduce memory latency and access time. In such examples, the processor 103 may retrieve data from or write data to the CPU cache rather than reading/writing to memory 113, which may improve the speed of these operations. In some examples, a database cache may be created in which certain data from a central database such as, for example, one or more enterprise servers 170 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 170. These types of caches and others may be included in various embodiments, and may provide potential advantages in certain implementations of retrieving and analyzing driving data, such as faster response times and less dependence on network conditions when transmitting/receiving driving data from a vehicle 140 (e.g., from vehicle-based devices such as on-board vehicle computers, short-range vehicle communication systems, telematics devices), data from one or more enterprise servers 170, etc.

The network interface 111 may allow risk index determination device 100 to connect to and communicate with a network 130. The network 130 may be any type of network, including a local area network (LAN) and/or a wide area network (WAN), such as the Internet, a cellular network, or satellite network. Through network 130, risk index determination device 100 may communicate with one or more other computing devices such as a user device 150 or a user device 160 (e.g., laptops, notebooks, smartphones, tablets, personal computers, servers, vehicles, home management devices, home security devices, smart appliances, etc.) associated with user or a user account. Through network 130, risk index determination device 100 may also communicate with one or more enterprise servers 170 to exchange related information and data.

Network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, network interface 111 may use various protocols, including TCP/IP, Ethernet, File Transfer Protocol (FTP), Hypertext Transfer Protocol (HTTP), etc., to communicate with user device 150, user device 160, and enterprise servers 170.

It will be appreciated that the network connections shown are illustrative and other means of establishing a communications link between the computers may be used. The existence of any of various network protocols such as Transmission Control Protocol/Internet Protocol ("TCP/IP"), Ethernet, File Transfer Protocol ("FTP"), Hypertext Transfer Protocol ("HTTP") and the like, and of various wireless communication technologies such as the Global System for Mobile Communications ("GSM"), Code Division Multiple Access ("CDMA"), Wi-Fi, Long-Term Evolution ("LTE"), and Worldwide Interoperability for Microwave Access ("WiMAX"), is presumed, and the various computing devices and mobile device location and configuration system components described herein may be configured to communicate using any of these network protocols or technologies.

Figure 2:
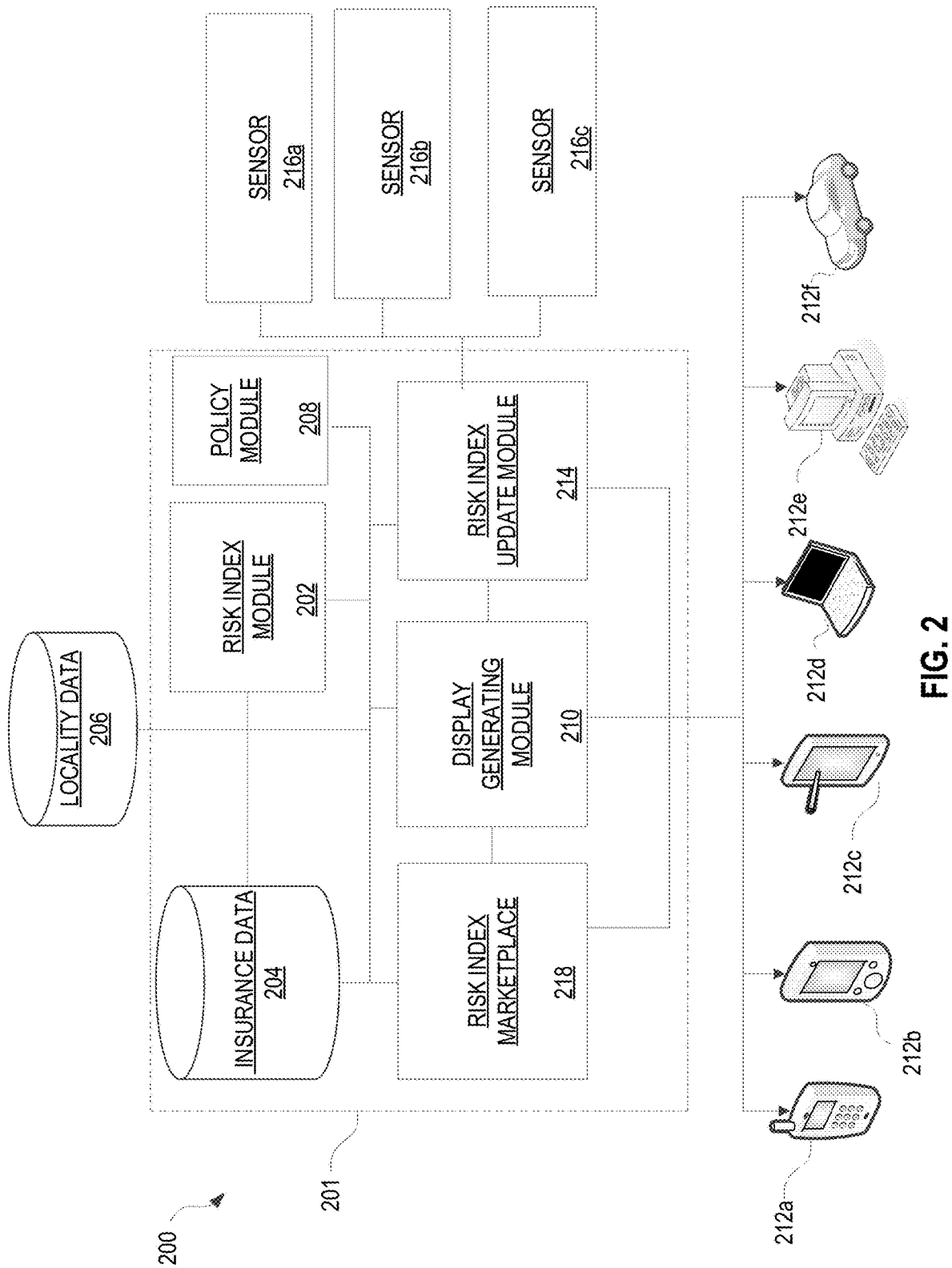
FIG. 2 illustrates a block diagram illustrating the system architecture in accordance with one or more aspects described herein.

FIG. 2 illustrates a schematic diagram of a risk index based insurance system 200 in accordance with one or more aspects described herein. The risk index based insurance system 200 may be associated with, internal to, operated by, or the like, an entity 201, such as an insurance provider. In some examples, the entity may be one of various other types of entities, such as a government entity, corporation or business, university, or the like. Various examples described herein will be discussed in the context of an insurance provider. However, nothing in the specification should be viewed as limiting use of the systems, methods, arrangements, etc. described herein to use only by an insurance provider.

The risk index based insurance system 200 may include one or more modules that may include hardware and/or software configured to perform various functions within the risk index based insurance system 200. The one or more modules may be separate, physical devices or, in other examples, one or more modules may be part of the same physical device.

The risk index based insurance system 200 may include a risk index module 202. The risk index module 202 may be configured to determine a rate or a cost to insure an average user for a predetermined period of time. For instance, the risk index module 202 may receive data, such as insurance data from insurance data store 204, locality data from locality data store 206, as well as other data (from data stores not shown that may be internal to the entity 201 or external to the entity 201), and determine, based on the received data, the cost to insure an average user over a predetermined period of time (e.g., one month, one week, one day, one year, or the like). Further, a cost to the user or insurance policy holder to purchase an insurance policy may be determined by the system. This cost may be based, at least in part, on one or more risk indices and may be determined on a fixed date. The cost to the user may then be revised at a second date (e.g., monthly, annually, etc.), e.g., based on an updated one or more risk indices. Accordingly, insurance may be provided to one or more users based on risk indices, as will be discussed more fully herein.

The risk index based insurance system 200 may further include a policy module 208. The policy module 208 may generate and/or store insurance policies using risk indices, as well as insurance policy information or factors, such as vehicle, home, or other property information, driving record/experience, policy limits, deductibles, etc. That is, a user may be insured through a policy that assigns a number of risk indices for determining a particular cost (e.g., insurance premium). The risk index or indices may continuously be updated (e.g., in real-time or near real-time) with additional information, for example, as the user drives or operates his or her vehicle. The risk index or indices may be consumed based on sensor data-focused factors. For example, in the context of vehicle insurance, such factors may include driving habits of the user, driving patterns, environmental conditions in which the user resides or operates his vehicle, vehicle parameters (such as year, make, model, features, specifications, etc.), condition or performance of the vehicle (e.g., based on sensor data), and the like, as well as traditional policy factors, such as driving experience, driving record, credit variables, policy coverage, deductible, policy limits, familiarity of the driver with the vehicle or surroundings, and the like. In some examples, one policy parameter may include a level of coverage. For instance, insurance coverage may be purchased at various levels with each level providing a different level of coverage in accordance with a determined risk index, as will be discussed more fully herein. Additionally or alternatively, the rate may reflect different levels of coverage.

The insurance policies may further be based on a risk index account stored in risk index update module 214. The risk index update module 214 may include one or more accounts associated with one or more users (e.g., users having risk index based insurance policies), vehicles (e.g., vehicles associated with a risk index based insurance policies), homes (e.g., vehicles associated with a risk index based insurance policies), or the like. The accounts may include information associated with a user such as name, address, contact information, and the like, as well as information associated with the vehicle, such as vehicle identification number, make, model, year, etc., or information associated with the home, such as address, number of rooms, square footage, size of the land plot, etc. Further, the accounts may include a number of risk indices associated with the user or account holder, associated with the vehicle or with the home, and the like. Accordingly, if a user has a risk index based insurance policy that includes a certain number of risk indices, the user account will show those risk indices. As additional information is received (e.g., by user updates, by receiving data from related devices, or the like) the various risk indices in the account may be updated. In some examples, the current value of risk indices in an account may be displayed to the user via a computing device, such as one or more of computing devices 212a-212f. For instance, a risk index value may be displayed via an application (e.g., online or mobile application) on a smartphone 212a, personal digital assistant (PDA) 212b, tablet 212c, a laptop 212d, or other computing device 212e. In some examples, a current risk index value may be displayed to a user on a vehicle display 212f. In addition to display of the risk infix factors, various other account details, and/or other related information may be displayed as desired.

In some arrangements, the risk index account may include other types of risk data (e.g., other than risk indices). For instance, the risk index account may include risk impact or probability. The related risk data may be updated based on receipt of additional information, as discussed above. In some examples, the risk indices may include one or more recommendations for the user to reduce the risk indices or other risk data associated with the risk indices that may be determined by applying a machine learning model to risk information associated with the user account. In some examples, additional information provided with a risk index may include a projected change in insurance premium upon a step being taken (or not taken) by a user that may similarly be determined by applying a machine learning model. Although various arrangements discussed herein will be described in terms of risk indices and other risk data associated with the risk indices, various other metrics or factors may be used (e.g., monetary units of risk) without departing from the present disclosure.

The risk index update module 214 may further include hardware and/or software configured to determine and/or implement updates to determined risk indices due to receipt of additional information (e.g., as the user continues to drive a vehicle, or as biometric data of the user continues to be received). In some examples, risk index update module 214 may receive updates from risk information sources at constant rates. In other examples, risk index update module 214 may receive updates upon the occurrence of an event, e.g., a user manual entry of data. Once new information is received, a new risk index may be determined, calculated, and/or evaluated. As discussed above, the risk indices may include additional risk information, such as an impact score and risk probability, as desired. In some examples, the risk index may be for a particular individual or user account. That is, data for each user may be used to determine a risk index for the user that may then be transmitted to the user account.

As discussed above, the rate at which risk indices are updated (e.g., based on receipt of additional data or information) may be based on a variety of factors, such as a source of the risk information, device capabilities, a type of risk data, a related confidence level of the risk information, e.g., based on a reliability of an associated risk information source, privacy considerations and restrictions, and the like. Further, various algorithms may be used to determine the influence of updated information on a risk index. The risk index update module 214 may utilize one or more machine learning tools such as, for example, a linear regression, a decision tree, a support vector machine, a random forest, a k-means algorithm, gradient boosting algorithms, dimensionality reduction algorithms, and so forth. For example, risk index update module 214 may be provided with training data comprising information related to one or more risk characteristics, and applications or services that have been determined to share such risk characteristics. Accordingly, risk index update module 214 may be trained, for example, via supervised learning techniques, based on such labeled data, to learn an association between the one or more risk characteristics and applications or services. Based on such information, risk index update module 214 may be trained to determine appropriate updates to one or more risk indices.

In some instances, risk information may be unstructured, and a combination of supervised and semi-supervised learning techniques may be utilized to train a machine learning model of risk index update module 214. For example, the risk index update module 214 may be configured to detect patterns in risk information, and apply these patterns to detect a type of risk data being collected. Also, for example, the risk index update module 214 may be configured to detect patterns between types of applications or services. The risk index update module 214 may be configured to analyze such and other factors, determine patterns, and determine clusters based on such patterns. In some embodiments, an output of the risk index update module 214 may be reviewed by a human operator. Accordingly, the human operator may confirm the analysis or modify it, and this may form additional training data for the risk index update module 214.

In some embodiments, the risk index update module 214 may generate feature vectors indicative of the one or more risk characteristics of an application or service. Such feature vectors may be compared, based on similarity or other distance measuring metrics, to determine applications or services that are proximate to each other. Accordingly, applications or services may be clustered based on similarity of the one or more risk characteristics.

Accordingly, one or more sensors 216a, 216b, and 216c (collectively referred to as sensors 216) may be used to obtain data that may be used to obtain updated risk information associated with the user. For instance, the one or more sensors may include sensors to detect driving behaviors of the user, such as hard braking, speeding, and the like. In another example, one or more sensors may be used to detect biometric information of a user such as heat rate, blood pressure, temperature, or the like. In another example, one or more sensors may be used to detect environmental conditions such as precipitation, humidity, cloud cover, or the like. In still another example, one or more sensors may be used to determine road conditions or to obtain information from outside sources (e.g., external databases, or the like) regarding traffic conditions, types of road (e.g., two-lane road, four-lane road), speed limit of the road, or the like. The data from one or more sensors 216, which may include data from combinations of different types of sensors, may be used by the risk index update module 214 to determine an updated risk index for the user.

In examples in which the insurance premium is determined based on traditional policy factors (either in combination with risk-index-focused factors or alone) the traditional policy factors, such as driving record, credit information, driving experience, vehicle features and/or specifications, coverages, deductibles, policy limits, etc. may be obtained from, for example, policy module 208. In some examples specific to vehicles, a risk index may be determined or calculated for a particular trip. Additionally or alternatively, the risk index may be calculated or determined in real-time or near real-time, such that the risk index may change as the user's driving behavior changes, as the type of road changes, as the environmental conditions change, or the like. Thus, for example, if a user is driving at speed higher than the speed limit and it is raining, the risk index may be higher than if the user is driving at the speed limit and/or there is no precipitation. This is merely one example of how risk index may change based on received sensor data or other information and should not be viewed as limiting the disclosure to only this example. Rather, various other changes in received sensor data or other information may be used to modify or alter the risk index.

Similar to the risk index account information, the risk index update may be displayed to a user, such as via one or more computing devices 212a-212f. In some examples, the risk index update module 214 may generate and/or display to a user suggestions for improving the risk index by applying the machine learning model to risk information associated with the user account. For instance, the system may generate, using the machine learning model an alternate route that has been determined to be safer than the user's current route and, thus, by taking the alternate route, the risk index may be reduced. In another example, a user may be driving faster than a posted speed limit. The system may generate a notice to display to the user (e.g., via a computing device 212a-212f) indicating that, by slowing down, the user's risk index may be reduced. These are merely some examples of messages that may be displayed in order to aid the user in reducing the risk index relating to a user account. However, various other suggestions or behavior modifications may be generated and provided to the user without departing from the scope of the present disclosure.

The risk index based insurance system 200 may further include a risk index marketplace 218. The risk index marketplace 218 may be connected to or in communication with various other modules within the risk index based insurance system 200. In some examples, the risk index marketplace 218 may be used to update one or more aspects of a user's account. For instance, upon the user reaching a predetermined low risk threshold within the user account of the user (e.g., the risk index within the account reaches a certain low risk threshold) the user may be notified that the risk index in the account is low and may offer one or more options for purchasing an insurance premium at a discounted rate in the account. In some examples, the user may receive a pre-notification, such that as the risk index approaches the threshold (e.g., is within a second threshold of the predetermined threshold) a notification may be generated and/or transmitted to a user (e.g., via a mobile device, on-board vehicle display, or the like). As another example, upon the user reaching a predetermined high risk threshold within the user account of the user (e.g., the risk index within the account reaches a certain high risk threshold) the user may be notified that the risk index in the account is high and may offer one or more recommendation to lower the risk threshold, and one or more options for purchasing additional insurance coverage in the account.

For example, in some instances, upon reaching a low threshold risk index within the account, a notification may be displayed to the user (e.g., via one or more of computing devices 212a-212f) indicating that the user account is approaching a level at which a risk index is considered "low" and offering an additional discounted insurance premium and/or providing a notification that the risk index is approaching a certain low risk threshold. In some instances, upon reaching the high threshold risk index within the account, a notification may be displayed to the user (e.g., via one or more of computing devices 212a-212f) indicating that the user account is approaching a level at which a risk index is considered "high" and providing one or more recommendation to lower the risk threshold, offering additional insurance coverage and/or providing a notification that the risk index is approaching a certain high risk threshold. In some examples, the user may store credit card or other payment information (e.g., account information, debit card information, electronic funds transfer information, and the like) in the system (e.g., within the risk index marketplace 218) such that, upon receiving the notification, the user may select a "purchase" option and the new insurance premium may be purchased by the user and charged to the stored payment information. In some arrangements, a user may input payment information (e.g., credit card information, debit card information, checking or other account information, electronic funds transfer information, and the like) and may identify a predetermined threshold below which the system may automatically purchase a new insurance premium. These and various other arrangements will be discussed more fully below.

The risk index marketplace 218 may also provide insurance premiums for sale to other users based on associated risk indices. For instance, a user may obtain insurance through a different insurance provider. Accordingly, users having insurance policies with other providers may purchase premiums from the risk index marketplace 218 and may have the risk indices applicable to an account associated with the policy provided by or associated with the other insurance provider. In some examples, entity 201 may charge a service fee or surcharge for purchase of premiums associated with a policy provided by another insurance carrier.

The display generating module 210 may generate one or more user interfaces, as described herein. Once a user interface is generated, it may be transmitted to one or more computing devices for display. For instance, a user interface may be transmitted to one or more of a smartphone 212a, personal digital assistant (PDA) 212b, tablet 212c, laptop 212d, or other computing device 212e. In some examples, the interface(s) may be displayed to a user on a vehicle display 212f, such as a dashboard display device of an on-board vehicle computing device. In some examples, one or more generated user interfaces, recommendations for reducing a risk index, or the like, may be displayed via the vehicle display 212f and may be transmitted to a second computing device (e.g., one of 212a-212e). However, in some examples, the system might not display the interface or notification on the second computing device 212a-212e until the system determines that an occurrence or event has ended. This may aid in providing the notification to the user on the second computing device in a more timely and efficient manner.

Figure 3:
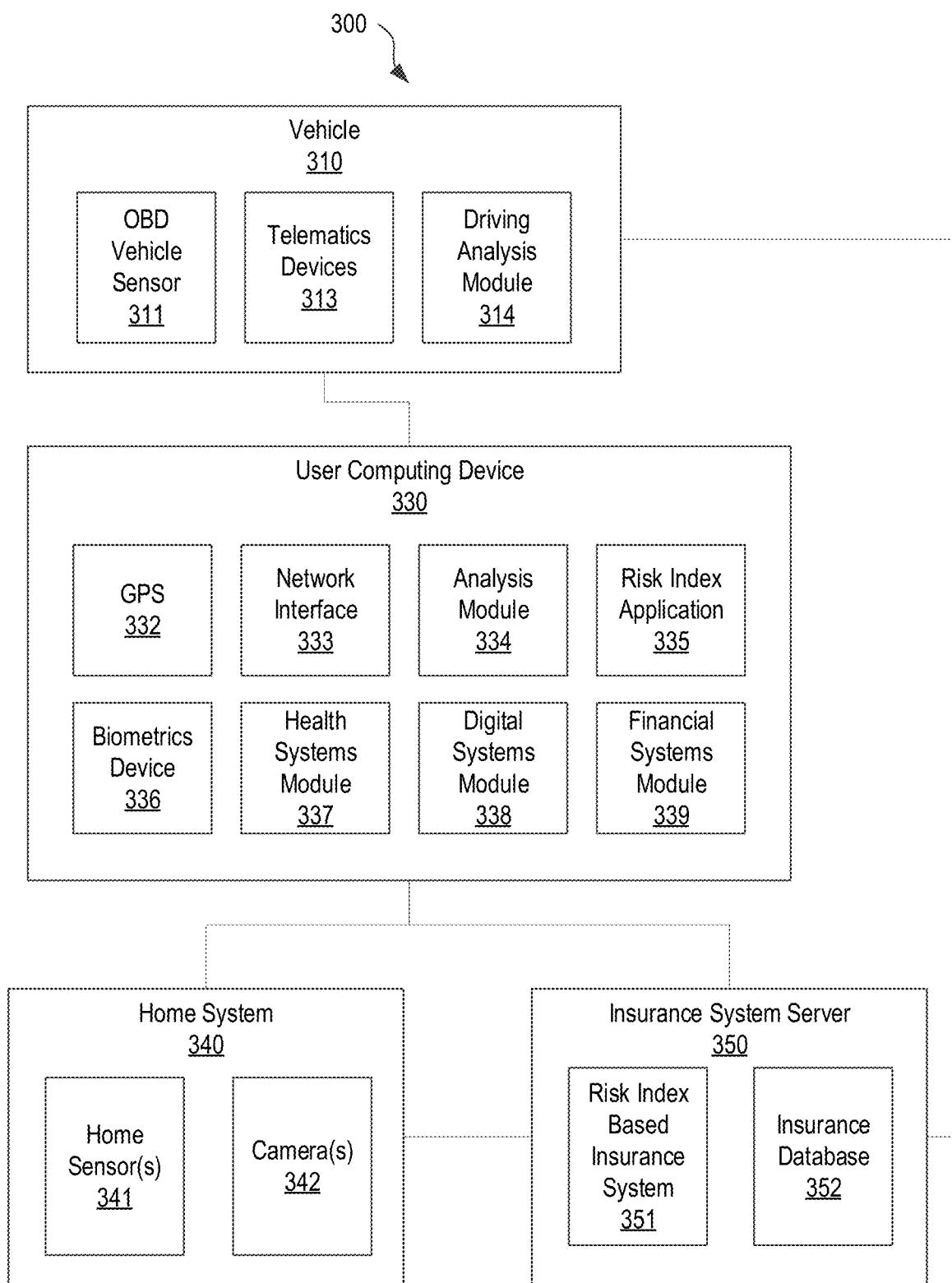
FIG. 3 illustrates a block diagram of a risk index determination and analysis system in accordance with one or more aspects described herein.

FIG. 3 illustrates a block diagram of risk index determination and analysis system 300 including additional aspects of the risk index based insurance system 200 shown in FIG. 2 and/or implementing the risk index based insurance system 200 of FIG. 2, in accordance with one or more aspects described herein. The system includes a vehicle 310, a user computing device 330, a home system 340, an insurance system server 350, and additional related components. As discussed below, the components of the system 300, individually or using communication and collaborative interaction, may determine, present, and implement various types of risk index based insurance to customers, including providing or facilitating purchase of a risk index based insurance policy and/or associated risk indices, determining an initial risk index or an updated risk index, communicating a risk index to a user, generating and providing suggestions to a user for reducing risk index, etc. To perform such features, the components shown in FIG. 3 each may be implemented in hardware, software, or a combination of the two. Additionally, each component of the system 300 may include a computing device (or system) having some or all of the structural components described above for the risk index determination device 100.

Vehicle 310 in the system 300 may be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) may be collected and analyzed. The vehicle 310 includes vehicle operation sensor 311 (similar to one or more of sensors 216a-216c of FIG. 2) capable of detecting and recording various conditions at the vehicle and operational parameters of the vehicle. For example, sensor 311 may detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensor 311 also may detect and store data received from the internal system of vehicle 310, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle's computer systems, including the vehicle on-board diagnostic systems (OBD).

Additional sensors 311 may detect and store the external driving conditions, for example, external temperature, rain, snow, light levels, and sun position for driver visibility. For example, external cameras and proximity sensors 311 may detect other nearby vehicles, vehicle spacing, traffic levels, road conditions, traffic obstructions, animals, cyclists, pedestrians, and other conditions that may factor into a driving data/behavior analysis. Sensor 311 also may detect and store data relating to moving violations and the observance of traffic signals and signs by the vehicle 310. Additional sensors 311 may detect and store data relating to the maintenance of the vehicle 310, such as the engine status, oil level, engine coolant temperature, odometer reading, the level of fuel in the fuel tank, engine revolutions per minute (RPMs), software upgrades, and/or tire pressure.

Vehicles sensor 311 also may include cameras and/or proximity sensors capable of recording additional conditions inside or outside of the vehicle 310. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensor 311 also may be configured to collect data identifying a current driver from among a number of different possible drivers, for example, based on driver's seat and mirror positioning, driving times and routes, radio usage, etc. Voice/sound data along with directional data also may be used to determine a seating position within a vehicle 310. Sensor 311 also may be configured to collect data relating to a driver's movements or the condition of a driver. For example, vehicle 310 may include sensors that monitor a driver's movements, such as the driver's eye position and/or head position, etc. Additional sensors 311 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer, along with other biometric sensors.

Certain vehicle sensors 311 also may collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors 311 and/or cameras may determine when and how often the vehicle 310 stays in a single lane or strays into other lane. A Global Positioning System (GPS), locational sensors positioned inside the vehicle 310, and/or locational sensors or devices external to the vehicle 310 may be used to determine the route, speed, lane position, road-type (e.g. highway, entrance/exit ramp, residential area, etc.) and other vehicle position/location data.

The data collected by vehicle sensor 311 may be stored and/or analyzed within the vehicle 310, such as for example a driving analysis module 314 integrated into the vehicle, and/or may be transmitted to one or more external devices. For example, as shown in FIG. 3, sensor data may be transmitted via a telematics device 313 to one or more remote computing devices, such as user computing device 330, insurance system server 350, and/or other remote devices.

As shown in FIG. 3, the data collected by vehicle sensor 311 may be transmitted to an insurance system server 350, user computing device 330, and/or additional external servers and devices via telematics device 313. Telematics device 313 may be one or more computing devices containing many or all of the hardware/software components as the risk index determination device 100 depicted in FIG. 1. As discussed above, the telematics device 313 may receive vehicle operation data and driving data from vehicle sensor 311, and may transmit the data to one or more external computer systems (e.g., insurance system server 350 of an insurance company, financial institution, or other entity) over a wireless transmission network. Telematics device 313 also may be configured to detect or determine additional types of data relating to real-time driving and the condition of the vehicle 310. The telematics device 313 also may store the type of vehicle 310, for example, the make, model, trim (or sub-model), year, and/or engine specifications, as well as other information such as vehicle owner or driver information, insurance information, and financing information for the vehicle 310.

In the example shown in FIG. 3, telematics device 313 may receive vehicle driving data from vehicle sensor 311, and may transmit the data to an insurance system server 350. However, in other examples, one or more of the vehicle sensors 311 or systems may be configured to receive and transmit data directly from or to an insurance system server 350 without using a telematics device. For instance, telematics device 313 may be configured to receive and transmit data from certain vehicle sensors 311 or systems, while other sensors or systems may be configured to directly receive and/or transmit data to an insurance system server 350 without using the telematics device 313. Thus, telematics device 313 may be optional in certain embodiments.

The system 300 in FIG. 3 also includes a user computing device 330. User computing device 330 may be, for example, a personal computer, a laptop, a smartphone or other mobile phone device, a tablet computer, and the like, and may include some or all of the elements described above with respect to the risk index determination device 100. As shown in this example, some user computing devices in system 300 (e.g., user computing device 330) may be configured to establish communication sessions with vehicle-based devices and various internal components of vehicle 310 via wireless networks or wired connections (e.g., for docked devices), whereby such user computing devices 330 may have secure access to internal vehicle sensors 311 and other vehicle-based systems. However, in other examples, the user computing device 330 might not connect to vehicle-based computing devices and internal components, but may operate independently by communicating with vehicle 310 via their standard communication interfaces (e.g., telematics device 313), or might not connect at all to vehicle 310.

User computing device 330 may include a network interface 333, which may include various network interface hardware (e.g., adapters, modems, wireless transceivers, etc.) and software components to enable user computing device 330 to communicate with insurance system server 350, vehicle 310, home system 340, and various other external computing devices. One or more specialized software applications, such as an analysis module 334 and/or a risk index application 335 may be stored in the memory of the user computing device 330. The analysis module 334 and risk index application 335 may be received via network interface 333 from the insurance server 350, vehicle 310, or other application providers (e.g., application stores). As discussed below, the analysis module 334 and risk index application 335 may or may not include various user interface screens, and may be configured to run as user-initiated applications or as background applications. The memory of the user computing device 330 also may include databases configured to receive and store vehicle data, driving data, driving trip data, and the like, associated with one or more drivers and/or vehicles.

Like the vehicle-based computing devices in vehicle 310, user computing device 330 also may include various components configured to generate and/or receive vehicle data, driver data, and driving data or other operational data. For example, using data from the GPS 332, an analysis module 334 may be able to identify starting and stopping points of driving trips, determine driving speeds, times, routes, and the like. Additional components of user computing device 330 may be used to generate or receive driving data for the analysis module 334 and/or risk index application 335, such as an accelerometer, compass, and various cameras and proximity sensors. As discussed below, these and other computing device components may be used to receive, store, and output various user/driver data, to identify starting and stopping points and other characteristics of driving trips, to determine various driving data such as speeds, driving routes and times, acceleration, braking, and turning data, and other driving conditions and behaviors. In some implementations, the analysis module 334 may store and analyze the data from various computing device components, and the risk index application 335 may use this data, alone or in any combination with other components or devices (e.g., insurance server 350), to determine and present insurance offers, insurance costs, and the like. The analysis module 334 and risk index application 335 may utilize machine learning and weighted equation modeling with the risk information inputs to a risk index.

When user computing devices within vehicles are used to detect vehicle driving data and/or to receive vehicle driving data from vehicle sensors, such user computing devices 330 may store, analyze, and/or transmit the vehicle driver data (e.g., data identifying a current driver), driving data (e.g., speed data, acceleration, braking, and turning data, and any other vehicle sensor or operational data), and driving trip data (e.g., driving route, driving times, driving destinations, etc.), to one or more other devices. For example, user computing device 330 may transmit driver data, driving data and driving behaviors, and driving trip data directly to one or more insurance servers 350, and thus may be used in conjunction with or instead of telematics devices 313. Moreover, the processing components of the user computing device 330 may be used to identify vehicle drivers and passengers, analyze vehicle driving data, analyze driving trips, determine parameters related to aspects of risk index based insurance policies, and perform other related functions. Therefore, in certain embodiments, user computing device 330 may be used in conjunction with, or in place of, the insurance system server 350.

Vehicle 310 may include driving analysis module 314, which may be separate computing devices or may be integrated into one or more other components within the vehicle 310, such as the telematics device 313, autonomous driving systems, or the internal computing systems of vehicle 310. As discussed above, driving analysis module 314 also may be implemented by computing devices independent from the vehicle 310, such as user computing device 330 of the drivers or passengers, or one or more separate computer systems (e.g., a user's home or office computer). In any of these examples, the driving analysis module 314 may contain some or all of the hardware/software components as the risk index determination device 100 depicted in FIG. 1. Further, in certain implementations, the functionality of the driving analysis module 314, such as storing and analyzing driver data, vehicle data, driving data and driving behaviors, and determining, presenting, and implementing aspects of risk index based insurance polies, may be performed in an insurance system server 350 rather than by the vehicle 310 or user computing device 330. In such implementations, the vehicle 310 and/or user computing device 330, might only collect and transmit driver data, vehicle data, driving data, and the like to the insurance server 350, and thus the vehicle-based driving analysis module 314 may be optional.

User computing device 330 may receive information from the vehicle 310, home system 340, and/or insurance system server 350, for use in various analyses and displays related to one or more risk indices as described in further detail herein. Additionally, user computing device may include GPS 332, network interface 333, analysis module 334, risk index application 335, biometrics device 336, health systems module 337, digital systems module 338, and/or financial systems module 339.

Biometrics device 336 may be coupled to health systems module 337 to measure and collect various biometric data associated with a user. In some examples, biometrics device 336 may be used to obtain biometric data verifying an identity of a user of the user computing device. The data may be transmitted to the health systems module 337, which may process real-time and/or near real-time data and then provide the processed information in a meaningful way for display via a graphical user interface ("GUI") on the user computing device 330. For example, an electro-cardiogram ("ECG") meter may identify a unique ECG signature for a user of user computing device 330, a fingerprint scanner may be used to obtain the user's fingerprint, a microphone may be used to collect a voiceprint of the user, a camera with facial recognition software may be used to obtain the user's facial features or structure, and/or various other sensors may be used for collection of various other types of biometric data. Physical activity data, such as steps taken in a predetermined time period (e.g., one day, one week, or the like), heart rate (e.g., resting heart rate, elevated heart rate, or the like), blood pressure, fitness or activity data, oxygen capacity, pulse, and the like may be captured by the biometrics device 336 and transmitted to the health systems module 337 for analysis. In some examples, biometrics device 336 may include a wearable device (e.g., fitness tracking device), and some data (e.g., step data, activity data, and the like) may be captured by the wearable device and transmitted to the health systems module 337 for analysis. In some examples, a request for physical trait data, e.g., from health systems module 337, may include a request for the user to capture data such as a current and/or resting heart rate, blood pressure, oxygen consumption, fitness level, or the like, captured via one or more sensors on or associated with the biometrics device 336. Additional user data may also be captured via the health systems module 337 and biometrics device 336, such as whether a user is a smoker (e.g., based on sensor data, facial analytics, or the like), blood pressure, diabetes, lung disease, and the like, may be determined using one or more sensors associated with biometrics device 336. In some examples, blood pressure and/or heart rate may be measured by measuring the wave form velocity of the blood flow in a user's finger using an image capture device of the biometric device 336. Additionally or alternatively, user physical (e.g., physical trait data) or biometric data may be manually input by the user of the user computing device 330. Additionally or alternatively, body mass index may be measured using user inputs of height and weight in combination with images of the user. In some examples, images may be captured and machine learning may be used to extract body measurements of the user from the images.

Digital systems module 338 may collect data captured or received from a variety of sources, including third party or external data sources, and may store user data related to financial transactions, purchase history, internet browsing history, social media data, ride share application or other application usage data, and the like. The data may be received directly from the user or via a third party. The data may be captured, stored, processed, and the like, with the permission of the user. In some examples, users may interact with the digital systems module 338, including providing user information and/or preferences, device information, account information, warning/suggestion messages, etc. Digital systems module 338 may store a user profile for one or more users that includes the users' privacy preferences, and may keep an account for each user and may identify the user when the user logs in or submits other identifying information. In other embodiments, user privacy preferences may be received by the digital systems module 338 when a user sends a request for a product or service. In some examples, digital systems module 338 may generate a user profile using, at least in part, data received and/or collected therefrom, or received from external sources associated with accounts in the user profile. The user profile may include details of the user, including but not limited to a user's name, age, address, driver's license number, credit card or bank information, insurance policies, networked devices associated with the user, and privacy preferences, etc. In some examples, users may manually enter additional and/or confirm information in their user profiles through a mobile application or computing device interface associated with the user computing device 330. In some examples, digital systems module 338 may store information associated with various devices (e.g., laptops, smartphones, tablets, personal computers, PDAs, and the like) linked to a user profile, such as security software updates, password protection settings, detected fraudulent activity, unverified device users, and the like. In some examples, additional information that may be entered by the user may include financial account details and or verification of online accounts used by a user.

Financial systems module 339 may detect potential fraud in one or more user accounts associated with the user profile or associated with one or more devices linked to the user profile. In some examples, financial systems module 339 may collect information using the user computing device 330 or other device, and may subsequently compare such information to past databases or fraud indicators. If the financial systems module 339 detects a potential fraud situation, the system may prevent the user from obtaining further user profile information through an automated process and may prompt for additional actions such as locking an associated user account pending further action. Additional financial information may be entered by the user, such as financial account details, verification of online accounts used by a user, and the like. In some examples, the financial systems module 339 may collect information from a variety of sources (e.g., credit monitoring services, identity theft protection services, user information protection services, etc.), and store the combined information in a database.

Home system 340 may collect various components of information associated with a home property, and may send such information to the user computing device 330 and/or the insurance system server 350. Additionally, the home system 340 may further include a plurality of home sensors 341. For example, the home system 340 may include a plurality of appliances and/or systems and one or more of the appliances and/or systems (e.g., devices) may be monitored by a plurality of home sensors 341 (e.g., one or more sensing devices). The plurality of home sensors 341 may monitor one or more features in a home and transmit monitored data to the user computing device 330 and/or the insurance system server 350. For example, a home may generally include a variety of systems, appliances, and the like that may be monitored by the plurality of home sensors 341. The plurality of home sensors 341 may include one or more sensors or sensing devices which may be arranged on or integrated into devices such as hot water heaters, refrigerators, washing machines, dryers, furnaces, air conditioning units, windows (e.g., to detect breakage), pipes (e.g., to detect leakage), utilities or utility meters, such as gas, water, and electric, and the like. For example, the plurality of home sensors 341 may include at least one of motion sensors, water heater sensors, power sensors, moisture sensors, temperature sensors, window sensors, sump pump sensors, heat or smoking sensing devices, presence sensors, float sensors, speed sensors, breakage sensors, cameras, proximity sensors, and the like. The home sensors 341 may include devices for sensing temperature, sewage backup, natural gas, propane, etc., air quality (e.g., carbon monoxide, etc.), air flow quality, water flow, and the like. Additionally, the home system 340 may include one or more cameras 342, such as security or other video cameras, live video feeds, and the like, that may receive and/or transmit video or other image data related to one or more appliances, systems, etc. In some examples, cameras 342 providing video monitoring or video feed may be monitoring the premises on a periodic or continuous basis. In some arrangements, the cameras 342 providing video monitoring or video feed may be in communication with one or more other sensing devices and may activate or begin monitoring, providing video feed, etc. upon an indication received from the one or more other sensing devices. In other examples, the plurality of home sensors 341 may include sensors or other monitoring devices that may be arranged on or integrated into paint, bricks or other building materials, and the like. In yet additional examples, the plurality of home sensors 341 may include "smart" materials, such as smart paints, smart bricks, and the like, that may provide indications of wear or potential failure.

The system 300 also may include one or more insurance system servers 350, containing some or all of the hardware/software components as the risk index determination device 100 depicted in FIG. 1. The insurance system server 350 may include hardware, software, and network components to receive driver data, vehicle data, and vehicle operational data/driving data from one or more vehicles 310, user computing devices 330, and other data sources. The insurance system server 350 may include an insurance database 352 and risk index based insurance system 351 to respectively store and analyze driver data, vehicle data, and driving data, etc., received from vehicle 310, user computing device 330, and other data sources. In some examples, the risk index based insurance system 351 may include many or all of the components of risk index based insurance system 200 described with respect to FIG. 2.

The insurance system server 350 may initiate communication with and/or retrieve driver data, vehicle data, and driving data from vehicle 310 wirelessly via telematics device 313, user computing device 330, or by way of separate computing systems over one or more computer networks (e.g., the Internet). Additionally, the insurance system server 350 may receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., driver score, coverage amount, deductible amount, premium amount, insured status) for the vehicle, driver, and/or other nearby vehicles and drivers.

Data stored in the insurance database 352 may be organized in any of several different manners. For example, a driver table in database 352 may contain all of the data for users associated with the insurance provider (e.g., customer personal information, insurance account information, demographic information, accident histories, risk factors, property scores, driving scores and driving logs, etc.), a vehicle table may contain all of the vehicle data for vehicles associated with the insurance provider (e.g., vehicle identifiers, makes, models, years, accident histories, maintenance histories, travel logs, estimated repair costs and overall values, etc.), and a driving trip table may store all of the driving trip data for drivers and vehicles associated with the insurance provider (e.g., driving trip driver, vehicle driven, trip time, starting and ending points, route driven, etc.). Other tables in the database 352 may store additional data, including data types discussed above (e.g. traffic information, road-type and road condition information, weather data, insurance policy data, etc.). Additionally, one or more other databases of other insurance providers containing additional driver data and vehicle data may be accessed to retrieve such additional data.

The risk index based insurance system 351 within the insurance system server 350 may be configured to retrieve data from the database 352, or may receive driver data, vehicle data, and driving trip directly from vehicle 310, user computing device 330, or other data sources, and may perform driving data analyses, determine insurance parameters for risk unit based insurance policies, and other related functions. The functions performed by the risk index based insurance analysis system 351 may be performed by specialized hardware and/or software separate from the additional functionality of the insurance system server 350. Such functions may be similar to those of driving analysis module 314 of vehicle 310, and the analysis module 334 and risk index application 335 of user computing device 330, and further descriptions and examples of the algorithms, functions, and analyses that may be executed by the risk index based insurance system 351 are described below.

In various examples, the driving data and driving trip analyses and/or risk index based insurance determinations may be performed entirely in the insurance system server 350, may be performed entirely in the driving analysis module 314, or may be performed entirely in the analysis module and risk index application 335 of user computing device 330. In other examples, certain analyses of driver data, vehicle data, and driving trip data, and certain risk unit based insurance determinations may be performed by vehicle-based devices (e.g., within driving analysis module 314) or user computing device 330 (e.g., within analysis module 334 and risk index application 335), while other data analyses and risk index based insurance determinations are performed by the risk unit based insurance system 351 at the insurance system server 350. For example, a vehicle-based driving analysis module 314, or the hardware and software components of user computing device 330 may continuously receive and analyze driver data, vehicle data, driving trip data, and the like to determine certain events and characteristics (e.g., commencement of a driving trip, identification of a driver, determination of a driving route or intended destination, driving data and behaviors during driving trips, etc.), so that large amounts of data need not be transmitted to the insurance system server 350. However, for example, after a driver, vehicle, and/or driving trip is determined by a vehicle-based device and/or mobile device, corresponding information may be transmitted to the insurance server 350 to perform insurance offer and cost determinations, determine updates to risk indices, generate one or more recommendations for reducing a risk index, etc. which may be transmitted back to the vehicle-based device and/or user computing devices.

Figure 4:
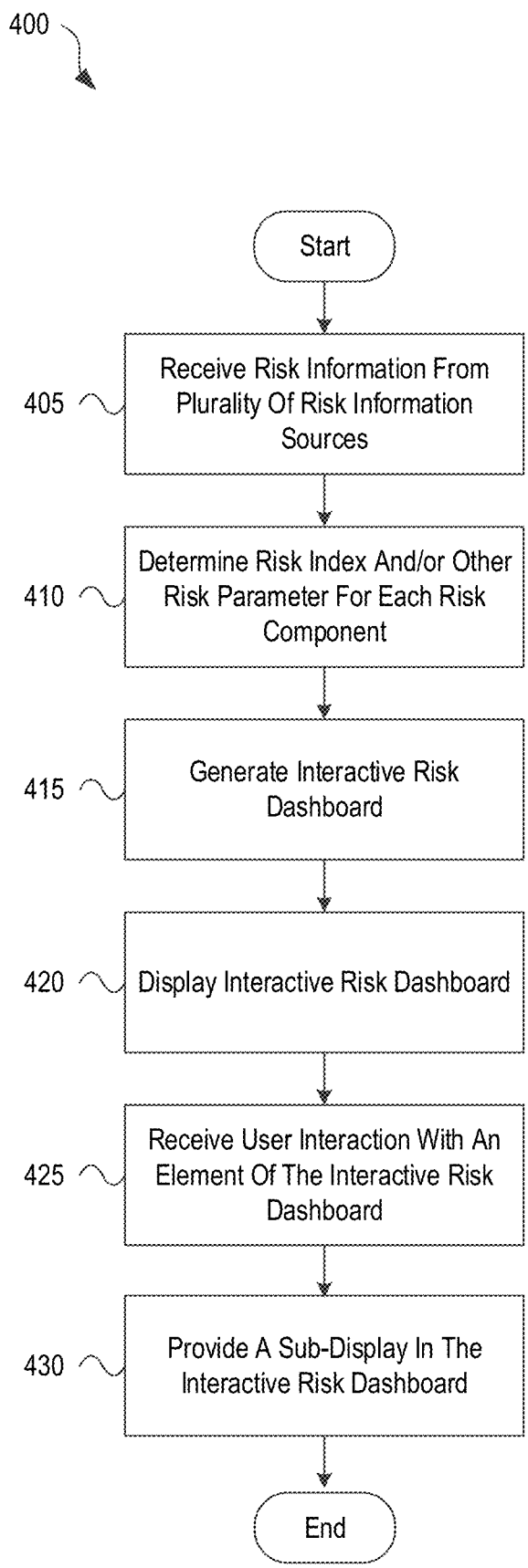
FIG. 4 illustrates an exemplary flowchart for generating and displaying an interactive risk index dashboard in accordance with one or more aspects described herein.

The steps that follow in FIG. 4 may be implemented by one or more of the components in FIGS. 1 through 3 and/or other components, including other computing devices. FIG. 4 illustrates an exemplary method 400 for generating and displaying an interactive risk index dashboard in accordance with one or more aspects described herein. In that regard, and as described above for FIGS. 1 through 3, the system may include at least one processor, a communication interface communicatively coupled to the at least one processor, and memory storing computer-readable instructions that, when executed by the processor, cause the system to perform a number of step, such as those shown in FIG. 4.

Figure 6:
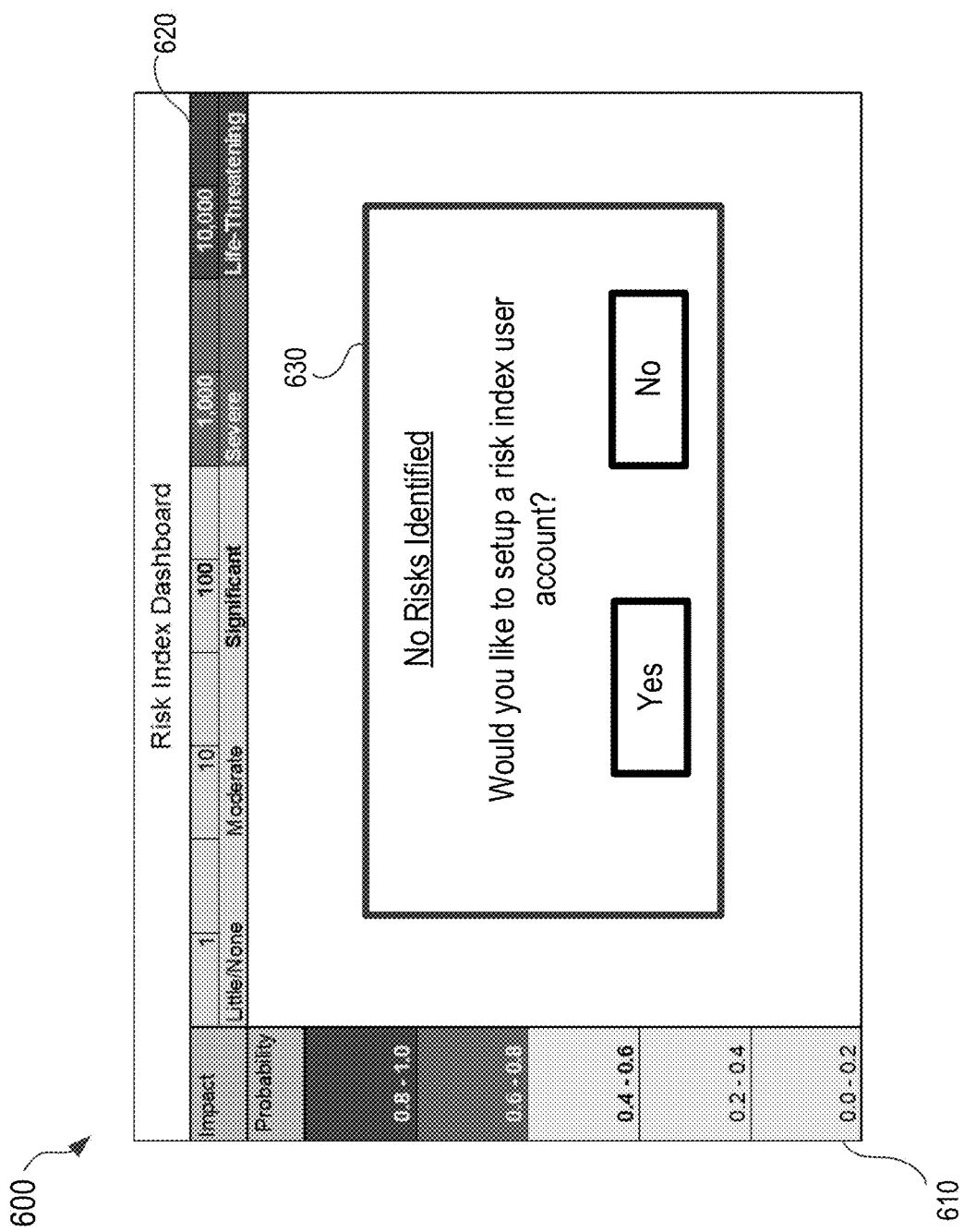
FIGS. 6-8 illustrate exemplary interactive risk index dashboard user interfaces in accordance with one or more aspects described herein.

Initially, at step 405, risk information is received, e.g., at the risk index determination device 100, from a plurality of risk information sources. In some instances, the initial setup for a user to determine one or more indices may include a display of a setup user interface, in which a user device may display a graphical user interface similar to graphical user interface 600, which is shown in FIG. 6. For example, the user device may display a user interface that notifies the user that a user account is not presently set up for generating one or more risk indices for a user account, and then provide the user with the option to create a user account and provide information for generating and displaying one or more risk indices. In that regard, an initial set of risk indices may be determined by a setup process, e.g., by linking one or more user accounts or user devices to provide risk information to the risk index determination device 100. Accordingly, by displaying the setup interface, the user may be given access to review various data associated with one or more risk indices and the related risk information as data is received and analyzed.

Referring again to FIG. 4, risk information data associated with a user is initially received from at a plurality of risk information sources at step 405. In some examples, step 405 may include receiving, from a plurality of risk information sources, risk information associated with a user account, where the risk information includes a plurality of risk components. The plurality of risk information sources may include data received from a number of other applications or devices, such as biometrics device 336, health systems module 337, digital systems module 338, financial systems module 339, vehicle sensors 311, telematics devices 313, home sensors 341, cameras 342, and the like.

Step 405 may include the retrieval of various types of data from one or more external devices. In some examples, the risk information may be received from a user and may be received, via a computing device (e.g., mobile device, or the like). The information may include information associated with the user, such as name, contact information, health information, property information, financial account information, digital property information, vehicle information, and the like. In some examples, a specific risk index may be determined based on one or more aspects of an insurance policy, e.g., a level of coverage. For instance, similar to conventional insurance policies, a user may select from different levels of protection (e.g., whether to include collision coverage, amount of coverage for personal property, and the like). Similarly, a risk index may be influences by a related amount of policy coverage. In another example, different levels of coverage selected may be reflected in various aspects of a risk index, or by presenting a plurality of risk indices for a given risk component. For instance, the risk index may vary based on a level of coverage selected. Although different levels of coverage may be available to a user, the levels offered may meet minimum standards for insurance coverage, such as those required by the state in which the user lives, or the like.

In some examples, the risk information sources may include user input, biometric devices, computing devices, geo-location devices, enterprise servers providing financial, insurance, health, vehicle, home, or other related data, user account servers, vehicle sensors or telematics devices, home or property devices, Internet of Things (IOT) devices, cameras, thermostats, police servers, weather servers, insurance system servers, financial system servers, traffic system servers, crime system servers, one or more user calendars, e.g., for detection of planned future occurrences, and the like.

At step 410, a risk index may be determined. As discussed above, the risk index may provide a quantification of a relative risk of an aspect associated with a user account. For instance, the risk index may include an impact score and a risk probability. A risk index may be determined for each risk component associated with a user account and may be used to provide risk index based insurance policies in which, a variable risk score influences an insurance premium that may be offered to the user. Step 410 may thus include determining an impact score and a risk probability for each of the plurality of risk components by applying a machine learning model to risk information associated with the user account. The determining may include using weighting and machine learning models and/or algorithms to arrive at the relevant risk indices, impact scores, and/or risk probabilities. In some instances, the risk index determination device 100 may be configured to dynamically tune the machine learning models and/or algorithms based on received feedback and/or as additional data is received from the various risk information sources. In some instances, the risk index determination device 100 may use a machine learning model to compute the risk index using weighted average scores, e.g., by maintaining a plurality of weighting values to be applied to each of the plurality of risk components. For example, risk index determination device 100 may utilize one or more machine learning tools such as, for example, a linear regression, a decision tree, a support vector machine, a random forest, a k-means algorithm, gradient boosting algorithms, dimensionality reduction algorithms, and so forth, to determine one or more relevant risk indices, impact scores, and/or risk probabilities. Additionally, a confidence level for each of the plurality of risk components may be determined. The confidence level may relate to a reliability of an associated risk information source.

At step 415, an interactive risk dashboard may be generated using the determined risk index. In some examples, a risk index based insurance policy may be generated for the user and a risk index account may be created for the user as part of step 415. The risk index account may be associated with the user or with a group of users, e.g., a family or a business. Generating the interactive risk dashboard may include generating a plurality of interactive risk component elements, each associated with a corresponding risk component of the plurality of risk components.

In some examples, a projected risk probability of a future risk occurrence may be calculated, determined, and/or evaluated based on the plurality of risk components and one or more variable settings. Accordingly, a plurality of projected risk probabilities may be provided with the generated interactive risk dashboard based on a plurality of the one or more variable settings.

In some examples, generating the interactive risk dashboard, or generating a portion of the interactive risk dashboard may include generating a first offer for a risk index-based insurance policy based on at least one of the plurality of risk components and current information associated with the at least one of the plurality of risk components, and generating a second offer for a risk index-based insurance policy based on the at least one of the plurality of risk components and based on the user completing a risk reduction recommendation associated with the at least one of the plurality of risk components. Accordingly, the first offer, the second offer, and the risk reduction recommendation may be displayed with a respective interactive risk component element or may be provided in a sub-display of the interactive risk dashboard upon a user interaction with a respective interactive risk component element.

At step 420, the interactive risk dashboard may be displayed to a display of the risk index determination device 100. Data related to various behaviors and conditions and/or traditional risk data, may be combined to determine the risk index in real-time or near real-time, e.g., as the user is operating a vehicle. Accordingly, the system may provide information associated with the risk index to the user. For instance, the vehicle display or mobile device of the user may display the current risk index. In another example, the display may include historical information associated with risk index based on previous information and/or a graphical display of previous and/or current risk indices. Displaying the interactive risk dashboard may include displaying each of the plurality of interactive risk component elements in a portion of the interactive risk dashboard in accordance with a respective determined impact score and risk probability. In some examples, the plurality of interactive risk component elements may be displayed in a grid format in the interactive risk dashboard, such that a first axis in the grid format displays the impact score and a second axis in the grid format displays the risk probability. In some examples, a total risk index based on the plurality of risk components may also be determined and subsequently displayed in a portion of the interactive risk dashboard. The total risk index may be a product of the risk probability and the impact score. In some examples, the total risk index may be the result of various machine learning tools or other algorithms associated with one or more types of risk or user data.

In some examples, a user prompt requesting additional risk information associated with the user account may also be presented in the displayed interactive risk dashboard. Such a user prompt may be provided, e.g., in response to determining information is lacking, or that a risk score could be improved with the provision of additional user information. Subsequently, user input may be received providing the requested additional risk information, and at least one of the interactive risk component elements may be updated in the interactive risk dashboard in accordance with the received user input.

At step 425, the risk index determination device 100 may receive a user interaction with a portion of the interactive risk dashboard. In some examples, the interaction may be with a portion correspondence to a certain risk element or risk component displayed within the interactive risk dashboard. In some examples, the interaction may be with a title portion, a summary portion, or a sidebar portion of the interactive risk dashboard.

At step 430, a sub-display may be provided in the interactive risk dashboard in accordance with the user interaction. In some examples, additional information associated with the selected portion of the interactive risk dashboard may be displayed based on the user interaction. In some examples, one or more of the plurality of interactive risk component elements in the interactive risk dashboard may each include one or more components of additional information that may be displayed with a respective interactive risk component element or provided in a sub-display of the interactive risk dashboard upon a user interaction with a respective interactive risk component element. In some examples, the one or more components of additional information may include at least one of: a descriptor, a categorical indicator, a risk coding indicator, or a risk reduction recommendation. The categorical indicator may include at least one of: finance, health, property (home and/or vehicle), digital, and the like. The risk reduction recommendation may include at least one of: a safer routing, a driver alerting, a safe parking alternative, and the like. The risk reduction recommendation may include guidance or recommendations to reduce a related risk index, a projected change in at least one of the impact score or the risk probability associated with the risk reduction recommendation, and/or an option to automatically modify an operation of a device or a vehicle, e.g., while an event is in progress as part of accepting the recommendation.

Accordingly, one or more aspects of the systems and methods described herein may be used to address technical difficulties associated with evaluation of various complex and differing types of risks. By incorporating machine learning models and techniques, the process of evaluating differing risks may be automated, quantified, and ultimately used for various discounts, awards, and/or recommendations. In doing so, one or more of the systems and methods described herein may conserve processing resources in risk index generation (e.g., by maintaining user account-specific information related to a risk score and/or by only prompting for generation of a risk index dashboard at certain intervals) and in the calculation of rates, premiums, discounts, targeted advertisements, or the like. Furthermore, one or more of the systems and methods described herein may provide context in which to view varying risk indices in a single, cohesive interactive dashboard.

In some examples, the risk index, the impact score and/or the risk probability may be automatically updated for an associated risk component upon receiving updated risk information from an associated risk information source. In some examples, the risk index, the impact score and/or the risk probability may be updated upon determining that an event associated with a risk element has been completed.

In some examples an alert may be provided upon determining that a risk index (and/or the impact score and/or the risk probability) of a risk component is above or meets a threshold for an associated risk component element.

In at least one example, the system that performs the various step, e.g., as shown in FIG. 4 may include a first computing device in signal communication with at least one other computing device. The first computing device may receive, from the at least one other computing device, risk information associated with a user account, wherein the risk information includes a plurality of risk components, e.g., as part of step 405. A second computing device may be provided that is in signal communication with the first computing device. The second computing device may be configured to record sensor data using at least one sensor, where the sensor data is associated with a risk component of the plurality of risk components. The second computing device may then transmit the sensor data to the first computing device. In some examples, the at least one sensor of the second computing device may include a biometric device and the sensor data may include biometric data relating to a user associated with the user account. In some examples, the at least one sensor may include a telematics device, and the sensor data may include vehicle data relating to a vehicle associated with the user account.

Since an enterprise organization's mission may be to protect for property or life uncertainties, a risk index application, such as those discussed herein may offer safety services that are personalized and location aware, such as safe routing, driver alerting, safe parking for driving use cases, and the like.

In some examples, such an application may offer safety services for a variety of use cases beyond driving, for example, safety for exercising outdoors (where is it safe to run, walk), relevant for life insurance, safety services for homes/properties, weather alerts, other relevant alerts, and the like. Such a holistic application may help with safety in general, and/or may help users prevent and deal mitigate uncertainties.

The arrangements described herein provide numerous advantages. For instance, uncertainties may be prevented based on understanding and personalizing risks, including with location awareness. Additionally, when dealing with accidents as they happen, such an application may be helpful in logging various information. For example, if a user's house is damaged from a storm, the application may provide simple and intuitive functionality to log all relevant information.

In some examples, the application may be connected to a variety of other sensors, such as wearable sensors, house IOT devices, thermostats, cameras, and the like, to collect data relevant for assessing one or more risk indices.

Lastly, safety services for privacy may be offered by the same application, including online privacy and also protecting the privacy of the data collected about the user, and such data may be shared only if the user has agreed when understood the balance between privacy and utility.

Figure 5:
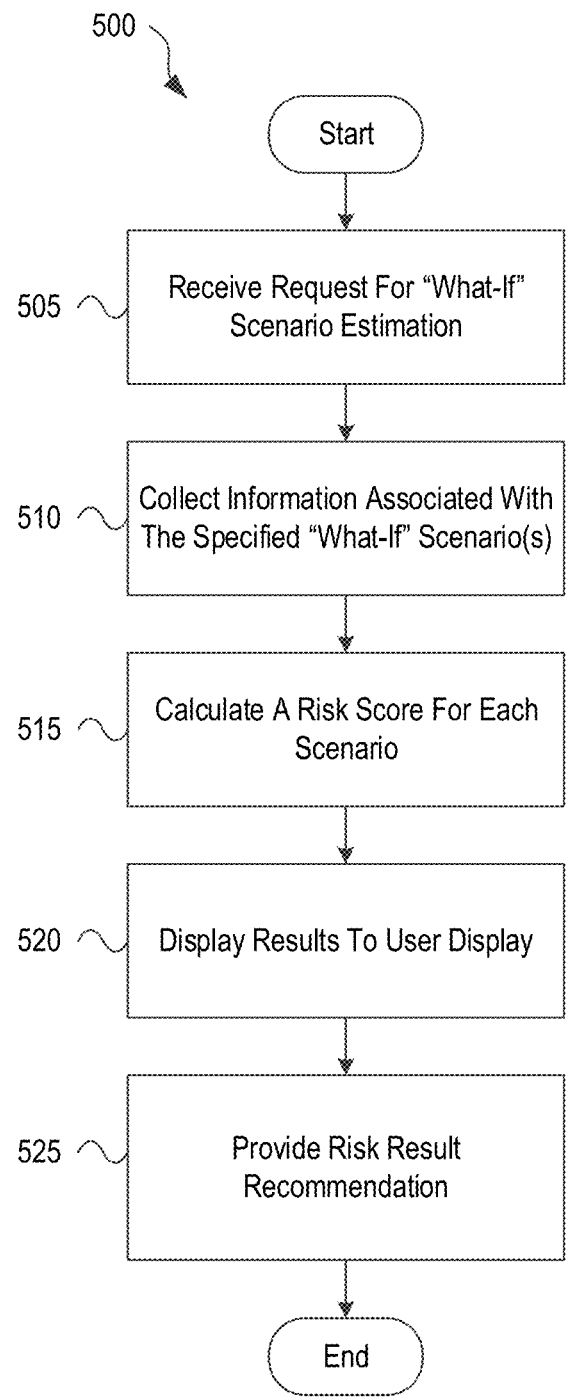
FIG. 5 illustrates an exemplary flowchart for generating a "what-if" scenario risk estimation of one or more forecasted events in accordance with one or more aspects described herein.

FIG. 5 illustrates an exemplary flowchart 500 for generating a "what-if" scenario risk estimation of one or more future risk occurrence or forecasted events by applying a machine learning model to risk information associated with a user account in accordance with one or more aspects described herein. In that regard, methods may additionally include computing a "what-if" scenario risk estimation of one or more forecasted events by applying the risk index determination device 100 to determine one or more probabilities of certain outcomes, such as shown in FIG. 5. This may include receiving a request for a "what-if" scenario estimation at step 505. The request may indicate a single scenario, a collection of scenarios (e.g., with varying factors for a common event), several different scenarios, and the like. The method may then include collecting information associated with the specified one or more "what-if" scenarios at step 510. The collected information may include information associated with the user account, e.g., from a plurality of risk information source that provide risk information associated with a user account. The collected information may include information specific to the one or more "what-if" scenarios, but general to any user. In some examples, collected information may include user account-specific information and scenario-specific information. Subsequently, the method may include calculating a risk score for each "what-if" scenario by applying a machine learning model to risk information associated with the user account at step 515. The risk score may include a compilation of risk indices associated with a respective scenario. At step 520, the results of the calculated risk score or scores, and, in some examples, additional related risk information and/or risk indices, are displayed to a user display. At step 525, a risk result recommendation may be provided to a user, e.g., in response to a user interaction with a portion of the results displayed at step 520. The risk result recommendation may include a selection of one scenario from a series of scenarios, e.g., associated with a lowest risk score. In some examples, the risk result recommendation may include a suggestion or a tip for a user to reduce a risk score associated with a given scenario. In some examples, the risk result recommendation may include an option to purchase an insurance plan or other product to reduce or mitigate a potential risk associated with a given scenario.

As an example of a "what-if" scenario risk estimation of one or more forecasted events applicable to methods discussed with respect to FIG. 5, a user may wish to run a "'What-if' scenario estimation" based on wanting to go on a trip and wanting to know risks associated with one or more trip destinations, modes of getting to a destination, timing of the trip, and the like. In that regard, the user can specify one or more destinations, whether the user is interested in traveling by air, car, plane, train, boat, and the like, one or more travel windows, one or more details associated with trip activities, and the like as part of step 505. At step 510, the risk index determination device 100 may collect various information related to the user, e.g., user driving records, vehicle records, user health records that may be relevant to traveling, insurance policies associated with the user, whether insurance policies are up to date, credit fraud reports associated with the user's financial records, and the like. The risk index determination device 100 may collect various information related to the one or more destinations, e.g., weather records and forecasts, current events, crime reports, health risks, access to emergency care, access to health care, and the like. The risk index determination device 100 may then determine, e.g., using machine learning and weighted equation modeling, risk scores associated with each scenario based on the various information, and may then present the results to the user via a user display, e.g., display device 117. A user may interact with the displayed results, e.g., by selecting one of the results. Selection of a result may then provide a risk result recommendation. For example, if a user selects to drive to a destination using his vehicle, the risk result recommendation may include a recommendation to get vehicle servicing before the trip, to renew a vehicle insurance policy, to leave for the destination at a certain time of day, to take a certain route to get to the destination, and the like.

Figure 7:
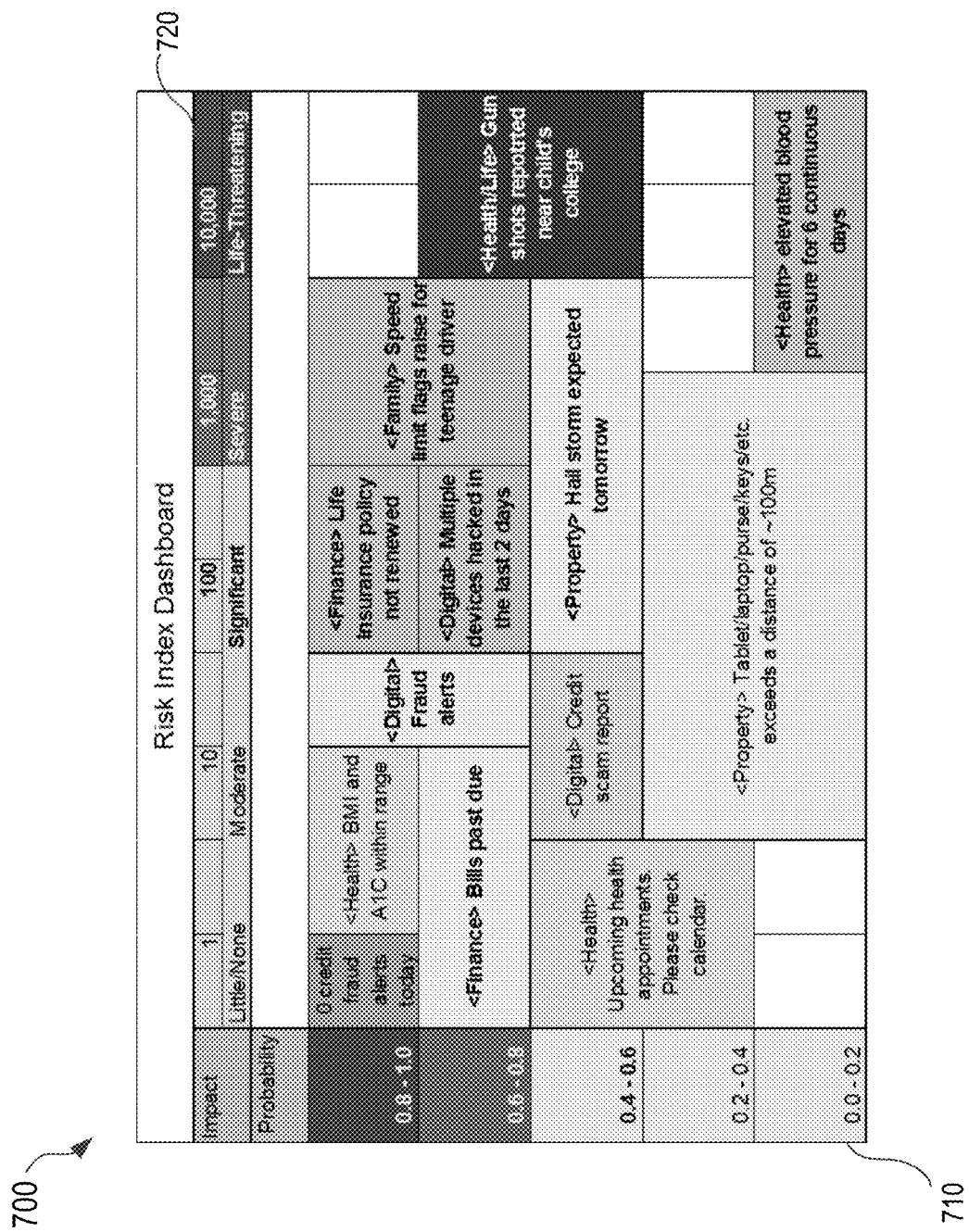
Figure 8:
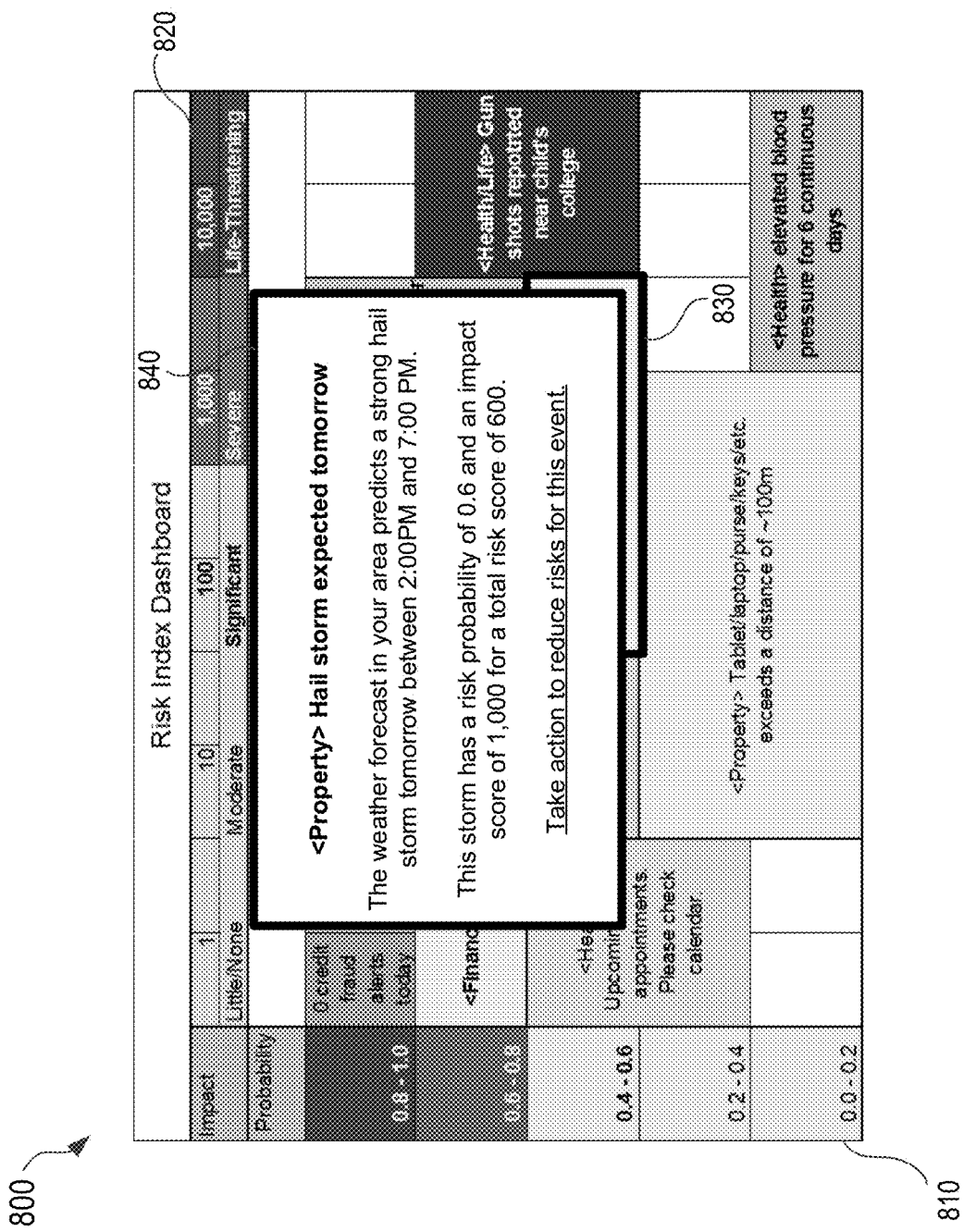

FIGS. 6-8 illustrate exemplary interactive risk index dashboard user interfaces in accordance with one or more aspects described herein that may provide to a user (e.g., via a vehicle display, mobile device, or other computing device) to provide information associated with one or more risk indices. FIG. 6 illustrates one example interactive risk index dashboard user interface 600 that does not yet list any risk indices. The interface 600 includes a grid format for the placement of various risk indices therein, with vertical axis 610 representing a calculated risk probability and horizontal axis 620 representing a calculated impact score. As shown in interface 600, vertical axis 610 displaying probability may be in the form of a percentage that ranges from 0 to 1.0 or that ranges from 0% to 100%. The probability may provide an estimation of the likelihood of a certain risk occurring. Horizontal axis 620 displaying impact may be in the form of a logarithmic score that ranges from 1 to 10,000. The impact may provide a general indication of a severity of an impact on the user if a certain risk does occur. The logarithmic scale may better capture a substantial increase in impact of risk affecting, e.g., a user's life or health as compared to other, relatively less severe risks, e.g., relating to the maintenance of digital property. Interface 600 displays a blank risk index dashboard, e.g., before a user has provided relevant user account information or before one or more external devices have been linked to a user account for use in determining one or more risk indices. In some examples, the blank risk index dashboard of interface 600 may also include a prompt 630 to a user to complete a setup process for determining one or more risk indices to be display in the risk index dashboard.

FIG. 7 illustrates one example interactive risk index dashboard user interface 700 that includes a plurality of risk indices, e.g., after a user has completed a setup process and/or linked the risk index dashboard to one or more external devices for use in determining one or more risk indices. Similar to interface 600, interface 700 includes a grid format for the placement of various risk indices therein, with vertical axis 710 representing a calculated risk probability and horizontal axis 720 representing a calculated impact score. A plurality of determined risk indices are shown in interface 700 in the grid format, as described, to graphically show relative impacts and probabilities of each of the risk indices. As shown in the interface 700, each of the risk indices may include a categorical indicator (e.g., "Finance," "Health," "Digital," "Property," "Life," "Family") and/or a descriptor (e.g., "Bills past due," "Fraud alerts," "Elevated blood pressure for 6 continuous days," "Hail storm expected tomorrow"). The risk indices may have a risk coding indicator (e.g., using various colors, texts, symbols, icons, and the like) that depict a relative severity, score, or other descriptor relating to the risk of a risk index. For example, risk coding indicators may employ a series of colors from green (low risk) to yellow (moderate risk) to red (high risk). As another examples, risk indices affecting health and personal safety may include a person icon, risk indices affecting vehicle may include a car icon, risk indices affecting digital property may have a computer icon, risk indices affecting finances may have a dollar sign icon, and the like.

FIG. 8 illustrates one example interactive risk index dashboard user interface 800 that includes additional risk information and a risk reduction recommendation option, e.g., upon a user selecting a given risk index portion of interface 700. Similar to interface 600 and interface 700, interface 800 includes a grid format for the placement of various risk indices therein, with vertical axis 810 representing a calculated risk probability and horizontal axis 820 representing a calculated impact score. Interface 800 shows a selected risk index box 830 highlighted and an additional risk information box 840 overlaid on the grid of interface 800. For example, upon a user selecting a risk index box 830 for "Hail storm expected tomorrow," then additional risk information box 840 appears and indicates "The weather forecast in your area predicts a strong hail storm tomorrow between 2:00 PM and 7:00 PM. This storm has a risk probability of 0.6 and an impact score of 1,000 for a total risk score of 600. Take action to reduce risks for this event." Thus, the additional risk information may provide further information than that displayed in the grid format, may display the exact calculated risk probability and impact score, and/or may include a risk reduction recommendation or link to a risk reduction recommendation. For example, the text for "Take action to reduce risks for this event" may include a user selectable link that, upon selection, provides an additional display with tips for reducing property damage during the hail storm (e.g., parking vehicles in a garage, placement of storm shutters over window, covering outdoor furniture, and the like). In some examples, risk recommendations may be performed on the user device, e.g., to pay a bill, to renew an insurance policy, to schedule a doctor appointment, to schedule vehicle maintenance, and the like.

Various other risk types and/or risk reduction recommendations may be identified based on the inputted data from a user, received data from one or more external devices, known risk factors and algorithms and the like. The examples described herein are merely some examples and are not intended to limit the risk types or related displayed information described herein. Rather, various other risks may be identified without departing from the scope of the present disclosure.

In some examples, risk index determination device 100 may automatically prompt, via the interactive risk index dashboard user interface, a user to take a risk reduction action, e.g., upon selection during the set up process for such automatic prompts. In some examples, risk index determination device 100 may determine that certain components of a user account are lacking, e.g., if a user skipped providing such components during an initial setup process, or if one or more external devices have not yet been linked to the user account. Accordingly, risk index determination device 100 may automatically prompt, via the interactive risk index dashboard user interface, a user to complete one or more additional steps to provide such missing components to the user account.

In some examples, generating the user interface may further include generating one or more recommendations for reducing risk indices, improving likely risks, and the like. The recommendations may be personalized for the user in that they are based, at least in part, on determined behaviors of the user, historical data of the user or other, e.g., similar users, or the like.

As discussed herein, various aspects of the risk index determination and analysis, risk probabilities and impact scores, risk reduction recommendations, notifications, and the like, may be displayed to the user (e.g., via a computing device display). For instance, items such as risk probabilities and impact scores, risk reduction recommendations, notifications, and the like, may be displayed. Additionally or alternatively, information such as alerts or notifications of various risks, identified risk issues, recommendations for risk scores, recommendations for avoiding risks, alerts regarding dangerous or high risk situations, and the like, may also be provided to the user via one or more displays or user interfaces. In some arrangements, particular factors affecting a risk index may be displayed to the user, such as driving data, vehicle data, weather forecasts, biometric data, credit reports, and the like. One or more recommendations for improving one or more risk indices may be provided with the one or more factors.

Further, although various aspects described herein relate to use of biometric data, sensor data, vehicle operation data, driving data, etc., the data collected and used herein may be used with permission of the user.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. An apparatus comprising:
   a display;
   one or more processors; and
   memory storing computer-readable instructions that, when executed by the one or more processors, cause the apparatus to:
      receive, from a plurality of risk information sources including sensors, risk information associated with a user account, wherein the risk information includes a plurality of risk components including telematics data from one or more of the sensors;
      determine, for each of the plurality of risk components, an impact score and a risk probability by applying a machine learning model to risk information associated with the user account;
      generate an interactive risk index dashboard including a plurality of interactive risk index elements, wherein each of the plurality of interactive risk index elements is associated with a risk component of the plurality of risk components;
      display, on the display of the apparatus, the interactive risk index dashboard, wherein each of the plurality of interactive risk index elements is displayed in a portion of the interactive risk index dashboard in accordance with a respective determined impact score and risk probability,
      receive real-time or near real-time risk information changes in at least one of driving behavior or environmental conditions from the sensors; and
      dynamically change the interactive risk index dashboard based on at least one of a changed impact score or a changed risk probability applied by the machine learning model to the real-time or near real-time risk information changes.

2. The apparatus of claim 1, wherein the memory stores additional computer-readable instructions that, when executed by the one or more processors, further cause the apparatus to:
   receive a user interaction with a portion of the interactive risk index dashboard; and
   based on the user interaction, display additional information associated with the portion of the interactive risk index dashboard.

3. The apparatus of claim 1, wherein the plurality of interactive risk index elements is displayed in a grid format in the interactive risk index dashboard.

4. The apparatus of claim 1, wherein each of the plurality of interactive risk index elements includes one or more components of additional information, and wherein the one or more components of additional information are displayed with a respective interactive risk index element or are provided in a sub-display of the interactive risk index dashboard upon a user interaction with a respective interactive risk index element.

5. The apparatus of claim 4, wherein the one or more components of additional information include at least one of: a descriptor, a categorical indicator, a risk coding indicator, or a risk reduction recommendation.

6. The apparatus of claim 1, wherein the memory stores additional computer-readable instructions that, when executed by the one or more processors, further cause the apparatus to:
   determine a total risk index based on the plurality of risk components; and
   display, in a portion of the interactive risk index dashboard, the total risk index.

7. The apparatus of claim 1, wherein the memory stores additional computer-readable instructions that, when executed by the one or more processors, further cause the apparatus to:
   display a user prompt requesting additional risk information associated with the user account;
   receive user input providing the requested additional risk information; and
   update at least one of the plurality of interactive risk index elements in the interactive risk index dashboard in accordance with the received user input.

8. The apparatus of claim 1, wherein the memory stores additional computer-readable instructions that, when executed by the one or more processors, further cause the apparatus to:
   determine a confidence level for each of the plurality of risk components, wherein the confidence level relates to a reliability of an associated risk information source.

9. The apparatus of claim 1, wherein the memory stores additional computer-readable instructions that, when executed by the one or more processors, further cause the apparatus to:
   calculate a projected risk probability of a future risk occurrence based on at least one of the plurality of risk components.

10. The apparatus of claim 1, wherein the memory stores additional computer-readable instructions that, when executed by the one or more processors, further cause the apparatus to:
    generate a first offer for a risk index-based insurance policy based on at least one of the plurality of risk components and current information associated with the at least one of the plurality of risk components; and
    generate a second offer for a risk index-based insurance policy based on the at least one of the plurality of risk components and based on the user completing a risk reduction recommendation associated with the at least one of the plurality of risk components,
    wherein the first offer, the second offer, and the risk reduction recommendation are displayed with a respective interactive risk index element or are provided in a sub-display of the interactive risk index dashboard upon a user interaction with a respective interactive risk index element.

11. A method comprising:
    receiving, from a plurality of risk information sources including sensors, risk information associated with a user account, wherein the risk information includes a plurality of risk components including telematics data from one or more of the sensors;
    determining, for each of the plurality of risk components, a risk score, the risk score including an impact score and a risk probability by applying a machine learning model to risk information associated with the user account;
    generating an interactive risk index dashboard including a plurality of interactive risk index elements, wherein each of the plurality of interactive risk index elements is associated with a risk component of the plurality of risk components;
    displaying, on a display of a user device, the interactive risk index dashboard, wherein each of the plurality of interactive risk index elements is displayed in a portion of the interactive risk index dashboard in accordance with a respective determined impact score and risk probability;
    receiving real-time or near real-time risk information changes in at least one of driving behavior or environmental conditions from the sensors;
    dynamically changing the interactive risk index dashboard based on at least one of a changed impact score or a changed risk probability applied by the machine learning model to the real-time or near real-time risk information changes; and
    responsive to receiving a user interaction at an interactive risk index element in the interactive risk index dashboard, providing an additional sub-display with information relating to the interactive risk index element.

12. The method of claim 11, further comprising:
    receiving a user interaction with a portion of the interactive risk index dashboard; and
    based on the user interaction, displaying one or more components of additional information associated with the portion of the interactive risk index dashboard.

13. The method of claim 11, wherein displaying the interactive risk index dashboard includes displaying the plurality of interactive risk index elements in a grid format in the interactive risk index dashboard.

14. The method of claim 11, wherein each of the plurality of interactive risk index elements includes one or more components of additional information, and wherein the method further comprises displaying one or more components of additional information with a respective interactive risk index element or in a sub-display of the interactive risk index dashboard upon receiving a user interaction with a respective interactive risk index element.

15. The method of claim 14, wherein the one or more components of additional information include at least one of: a descriptor, a categorical indicator, a risk coding indicator, or a risk reduction recommendation.

16. A system comprising:
    a first computing device in signal communication with at least one other computing device, wherein the first computing device comprises:
        a display;
        a processor; and
        memory storing instructions that, when executed by the processor, cause the first computing device to:
            receive, from a plurality of risk information sources including sensors, risk information associated with a user account, wherein the risk information includes a plurality of risk components including telematics data from one or more of the sensors;
            determine, for each of the plurality of risk components, an impact score and a risk probability by applying a machine learning model to risk information associated with the user account;
            generate an interactive risk index dashboard including a plurality of interactive risk index elements, wherein each of the plurality of interactive risk index elements is associated with a risk component of the plurality of risk components;
            provide, on the display, the interactive risk index dashboard, wherein each of the plurality of interactive risk index elements is displayed in a portion of the interactive risk index dashboard in accordance with a respective determined impact score and risk probability;
            receive real-time or near real-time risk information changes in at least one of driving behavior and environmental conditions from the sensors; and
            dynamically change the interactive risk index dashboard based on at least one of a changed impact score and a changed risk probability applied by the machine learning model to the real-time or near real-time risk information changes.

17. The system of claim 16, further comprising a second computing device in signal communication with, wherein the second computing device comprises:
    a processor;
    at least one sensor;
    a wireless communication interface; and
    memory storing instructions that, when executed by the processor, cause the second computing device to:
        record sensor data using the at least one sensor, wherein the sensor data is associated with a risk component of the plurality of risk components; and
        transmit the sensor data to the first computing device.

18. The system of claim 17, wherein the at least one sensor includes a biometric device and the sensor data includes biometric data relating to a user associated with the user account.

19. The system of claim 17, wherein the at least one sensor includes a telematics device and the sensor data includes vehicle data relating to a vehicle associated with the user account.

20. The system of claim 16, wherein each of the plurality of interactive risk index elements includes one or more components of additional information, and wherein the one or more components of additional information are displayed with a respective interactive risk index element or are provided in a sub-display of the interactive risk index dashboard upon a user interaction with a respective interactive risk index element.

21. The apparatus of claim 1, wherein the interactive risk index dashboard includes one axis representing a calculated risk probability and another axis representing a calculated impact score.

* * * * *